March 18, 1952 L. O. CARLSEN ET AL 2,589,475
MACHINE FOR PRODUCING GEARS
Filed April 21, 1948 13 Sheets-Sheet 5

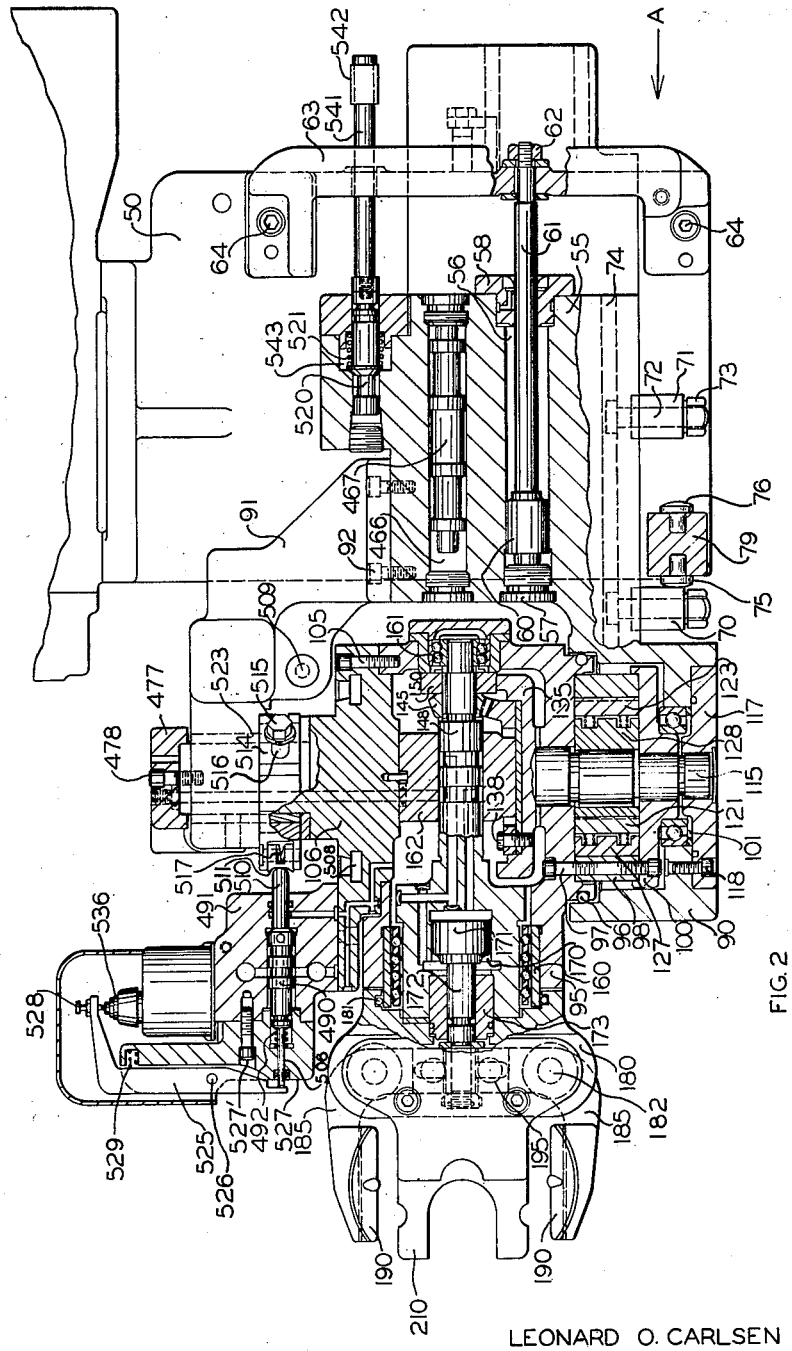

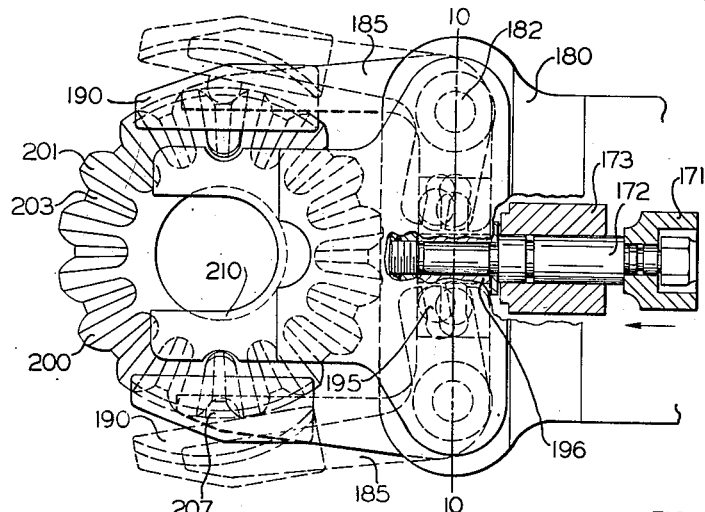
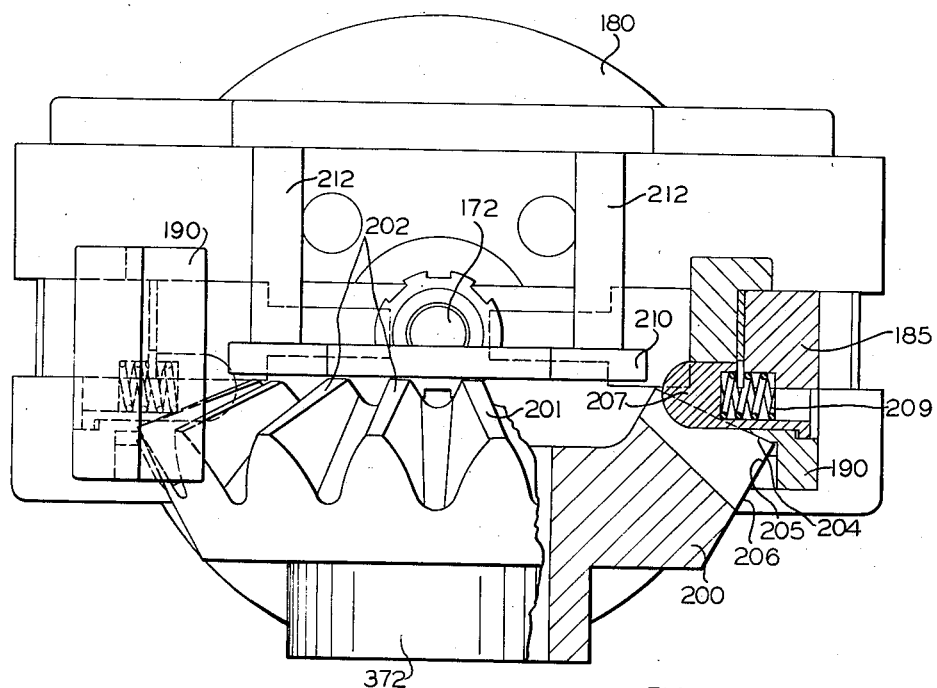

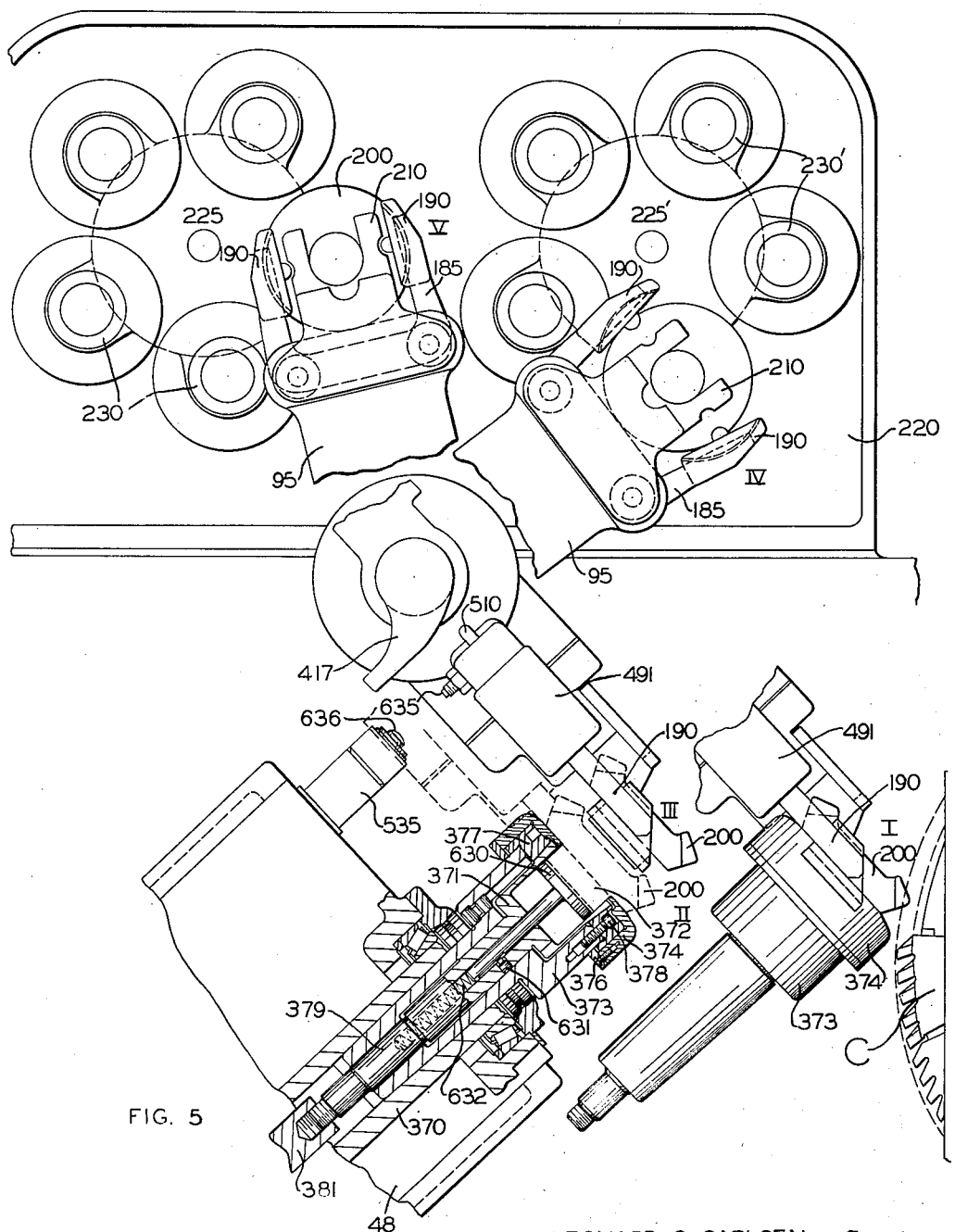

LEONARD O. CARLSEN   Inventor
NORMAN W. FOWLER

By

Attorney

Inventor
LEONARD O. CARLSEN
NORMAN W. FOWLER
Attorney

March 18, 1952   L. O. CARLSEN ET AL   2,589,475
MACHINE FOR PRODUCING GEARS

Filed April 21, 1948   13 Sheets-Sheet 7

Inventor
LEONARD O. CARLSEN
NORMAN W. FOWLER
By
Attorney

March 18, 1952  L. O. CARLSEN ET AL  2,589,475
MACHINE FOR PRODUCING GEARS
Filed April 21, 1948  13 Sheets-Sheet 8
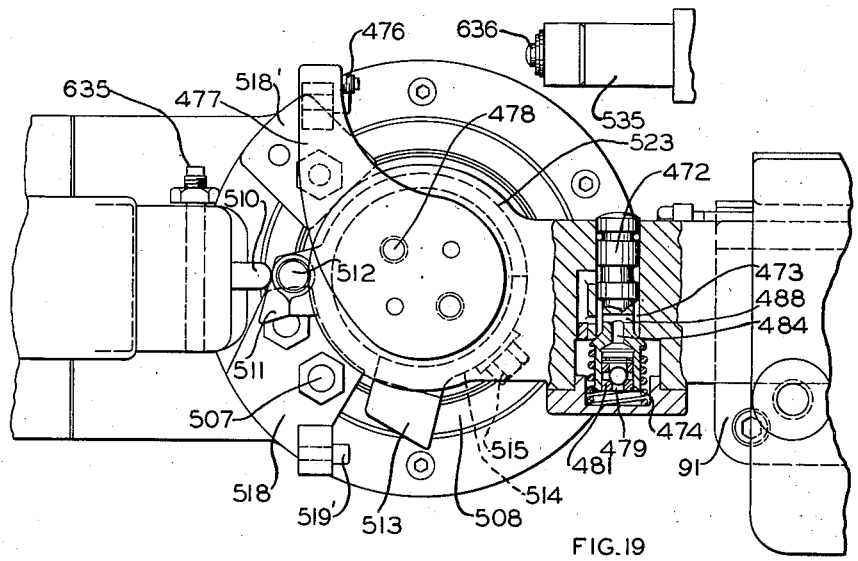
FIG. 19
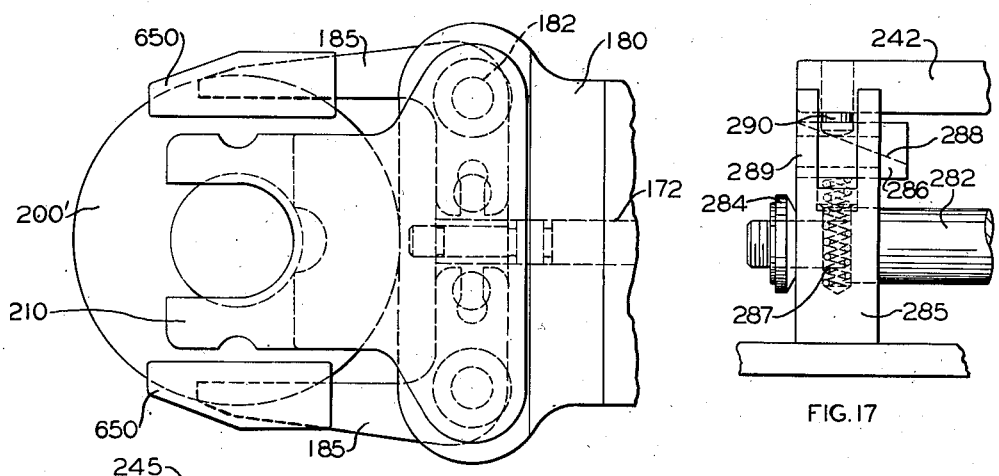
FIG. 20
FIG. 17
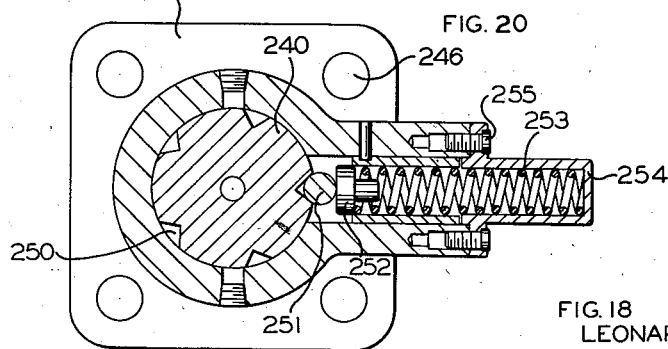
FIG. 18
Inventor
LEONARD O. CARLSEN
NORMAN W. FOWLER
By
Attorney March 18, 1952 L. O. CARLSEN ET AL 2,589,475
MACHINE FOR PRODUCING GEARS
Filed April 21, 1948 13 Sheets-Sheet 9
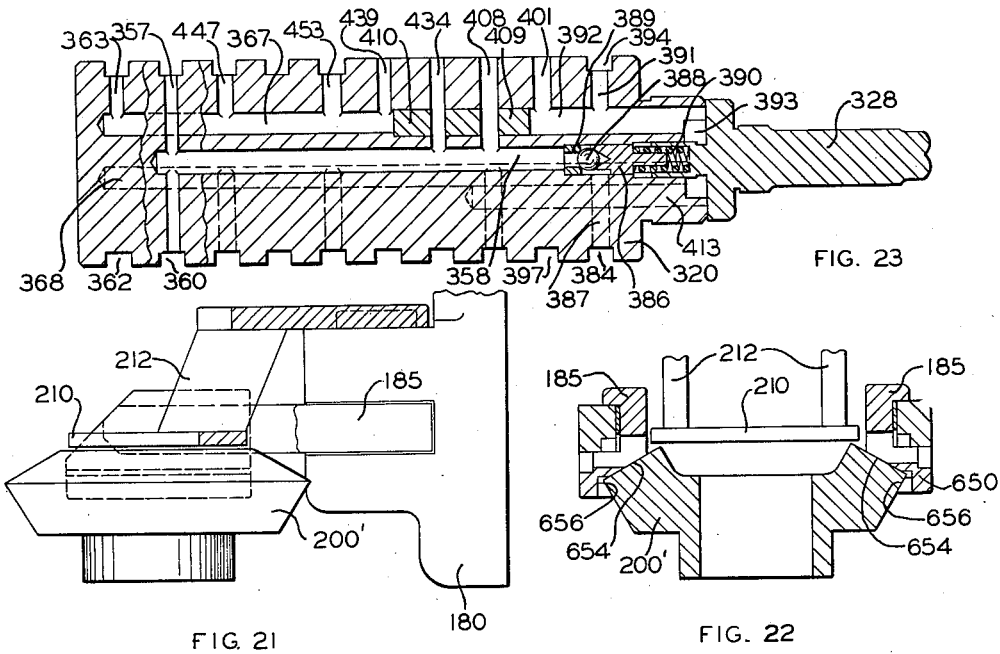
FIG. 23
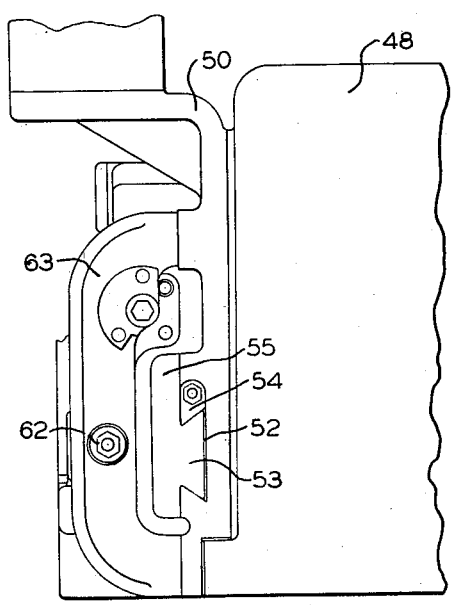
FIG. 21
FIG. 22
FIG. 39
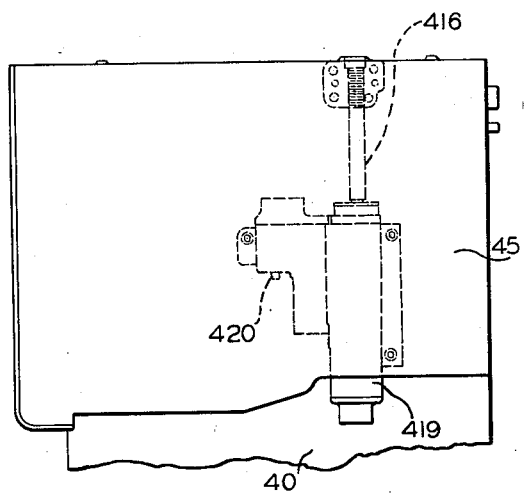
FIG. 40
LEONARD O. CARLSEN  Inventor
NORMAN W. FOWLER
Attorney

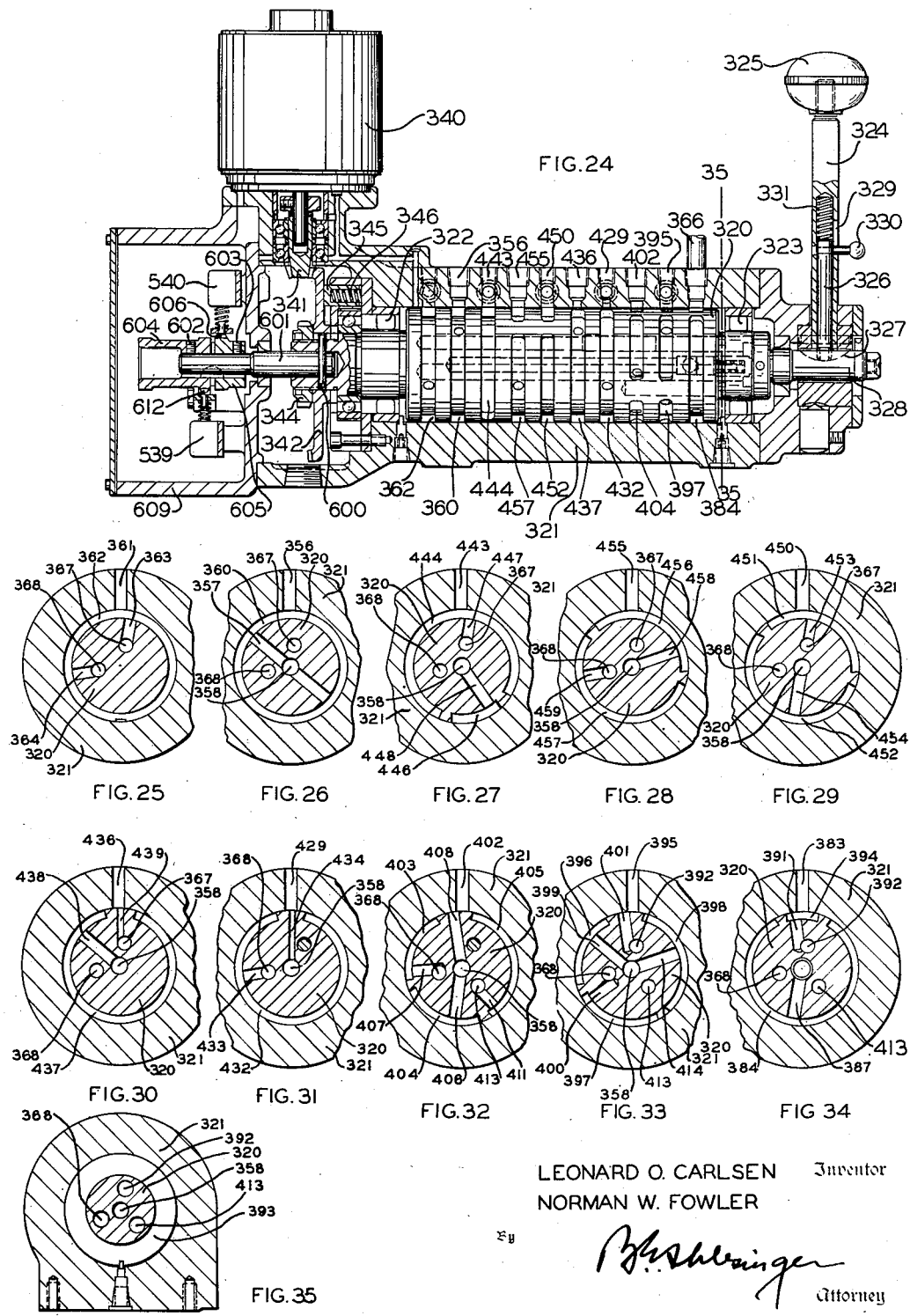

Inventor
LEONARD O. CARLSEN
NORMAN W. FOWLER
By
Attorney

March 18, 1952

L. O. CARLSEN ET AL 2,589,475

MACHINE FOR PRODUCING GEARS

Filed April 21, 1948

LEONARD O. CARLSEN
NORMAN W. FOWLER
Inventor

By

Attorney

LEONARD O. CARLSEN Inventor
NORMAN W. FOWLER
Attorney

Patented Mar. 18, 1952

2,589,475

UNITED STATES PATENT OFFICE 2,589,475

MACHINE FOR PRODUCING GEARS

Leonard O. Carlsen, Rochester, and Norman W. Fowler, Brighton, N. Y., assignors to Gleason Works, Rochester, N. Y., a corporation of New York Application April 21, 1948, Serial No. 22,436

12 Claims. (Cl. 90—1)

The present invention relates to machine tools and to mechanism for automatically loading and unloading the work from machine tools. More particularly, the invention relates to machines for producing gears and to mechanism for automatically loading and chucking the work on the work spindles of such machines and for automatically removing from the work spindles the completed gears.

One object of the invention is to provide an improved type of loading mechanism which can be interlocked in operation with the gear cutting or other machining operations of the machine on which the loading mechanism is used, so that on completion of the machining operations on a work piece, the completed work piece is automatically withdrawn from working position, dechucked, and stripped from the work spindle, and thereupon a new work piece is automatically taken from a magazine, loaded on the work spindle, chucked, moved into working position, and the machining operations of the machine are then restarted.

Another object of the invention is to provide a loading mechanism which will more securely and more firmly grip the work for and during transfer operations.

Another object of the invention is to provide an improved type of loading mechanism with which the transfer operations can be effected in a minimum length of time.

To these ends, a further object of the invention is to provide a loading mechanism having gripping jaws which are adapted to be closed to grip the work and to be opened to release the work and which is so constructed and operated that during the whole of the machining operations on the work they are open but in registry with the work, so that at the end of the machining operations, they need only be closed to grip the work and then the unloading of the work spindle can be effected.

A further object of the invention is to provide a loading mechanism of the character described in which the gripping jaws are so constructed that they operate not only as grippers to grip the work but as strippers to strip the work from the work spindle when moved outwardly away from the work spindle, thereby obviating requirement for separate work-stripping means.

Another object of the invention is to provide in conjunction with an automatic loading mechanism an improved type of magazine which is compact and which will hold within a given space a large number of work-pieces, so that the machine, on which the loading mechanism is employed, may continue automatically in operation for a long period of time without attention of the operator.

A further object of the invention is to provide means for automatically feeding the work pieces successively from the magazine to position where they may be automatically picked up by the loading mechanism, at proper intervals in the operation of the machine, to be loaded onto the work spindle.

Another object of the invention is to provide a removable type of magazine which can readily be lifted off the machine when empty and replaced by a full magazine without stopping the operation of the machine, and which can itself readily be replenished.

A further object of the invention is to provide, in a mechanism of the character described, a second magazine for holding completed work pieces and to which each completed work-piece is transferred after being unloaded from the work spindle upon completion of the machining operations thereon.

Another object of the invention is to provide a magazine for completed work-pieces which is also removable so that when full it may be taken off the machine and emptied without stopping the operation of the machine.

Another object of the invention is to provide a loading mechanism, particularly for use in loading toothed gear blanks in which the stock or supply magazine is so constructed as to position the work pieces so that, when picked up by the gripping jaws, they may be in position to have approximately the correct relation to the cutting tools of the machine when loaded on the work spindle.

A further object of the invention is to provide a loading mechanism of the character described in which the gripping jaws are so constructed as to position each toothed work-piece accurately with relation to the cutting tools of the machine when the work-piece is loaded on the work spindle of the machine.

Another object of the invention is to provide a loading mechanism on which the gripping jaws can quickly be changed to handle either solid or toothed work pieces.

A further object of the invention is to provide a loading mechanism in which the various operations of movement of the work to chucking position upon completion of a work piece, dechucking of the completed work piece, stripping of it from the work spindle, deposit of it in the magazine for completed work pieces, picking up of a new work piece from the stock or supply magazine, placing of this new work piece on the work spindle, chucking of this new work piece, return of the work to work position, and restarting of the cutting operation are all timed relative to one another and so interlocked that they can not get out of sequence.

Still a further object of the invention is to provide a simple and compact type of loading mechanism which is adapted for use on standard forms of gear cutting machines with but slight modification of such machines.

Other objects of the invention will be apparent hereinafter from the specification and from the recital of the appended claims.

In the drawings:

Fig. 2 is a view of the loading mechanism itself on an enlarged scale, with parts broken away;

Fig. 3 is a view on a further enlarged scale, showing one type of work gripping jaws that may be used in the loading mechanism of the present invention for handling gears that have previously been rough-cut and require only that their tooth surfaces be finish-cut;

Fig. 4 is a view on a still further enlarged scale, showing the work held by the jaws, the view being taken looking at Fig. 3 from the left thereof, parts being broken away and shown in section;

Figure 6:
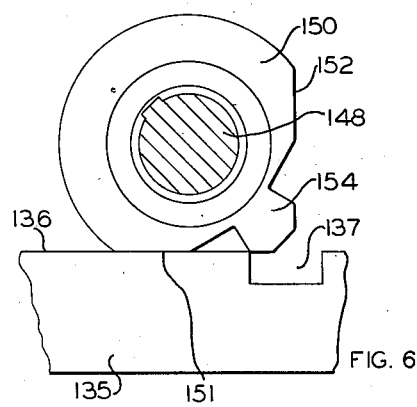
Figure 10:
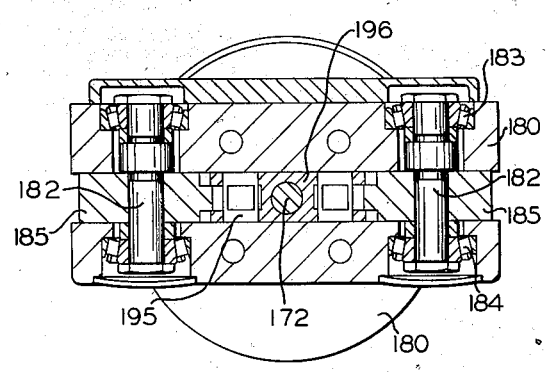
Figure 7:
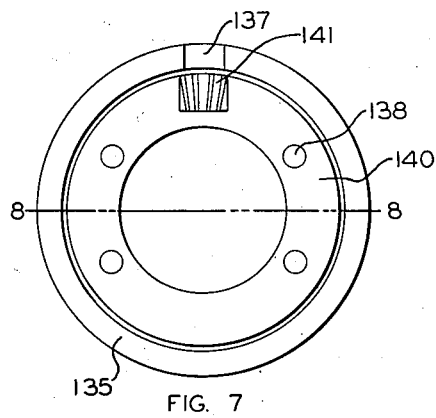
Figure 11:
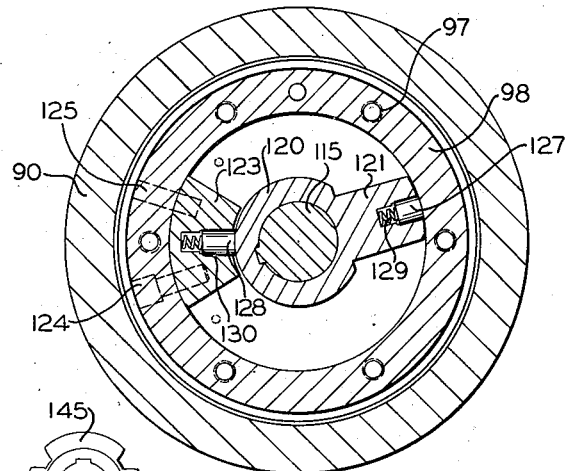
Figure 8:
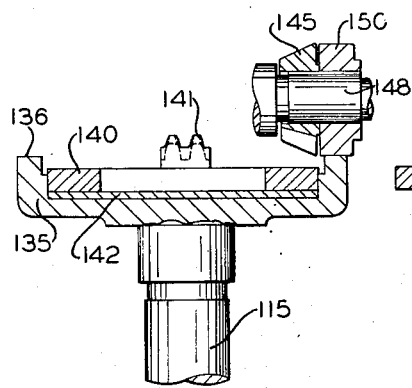
Figure 9:
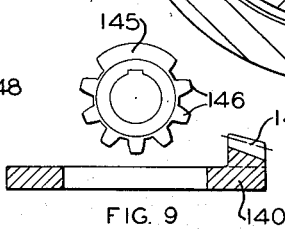
Figure 12:
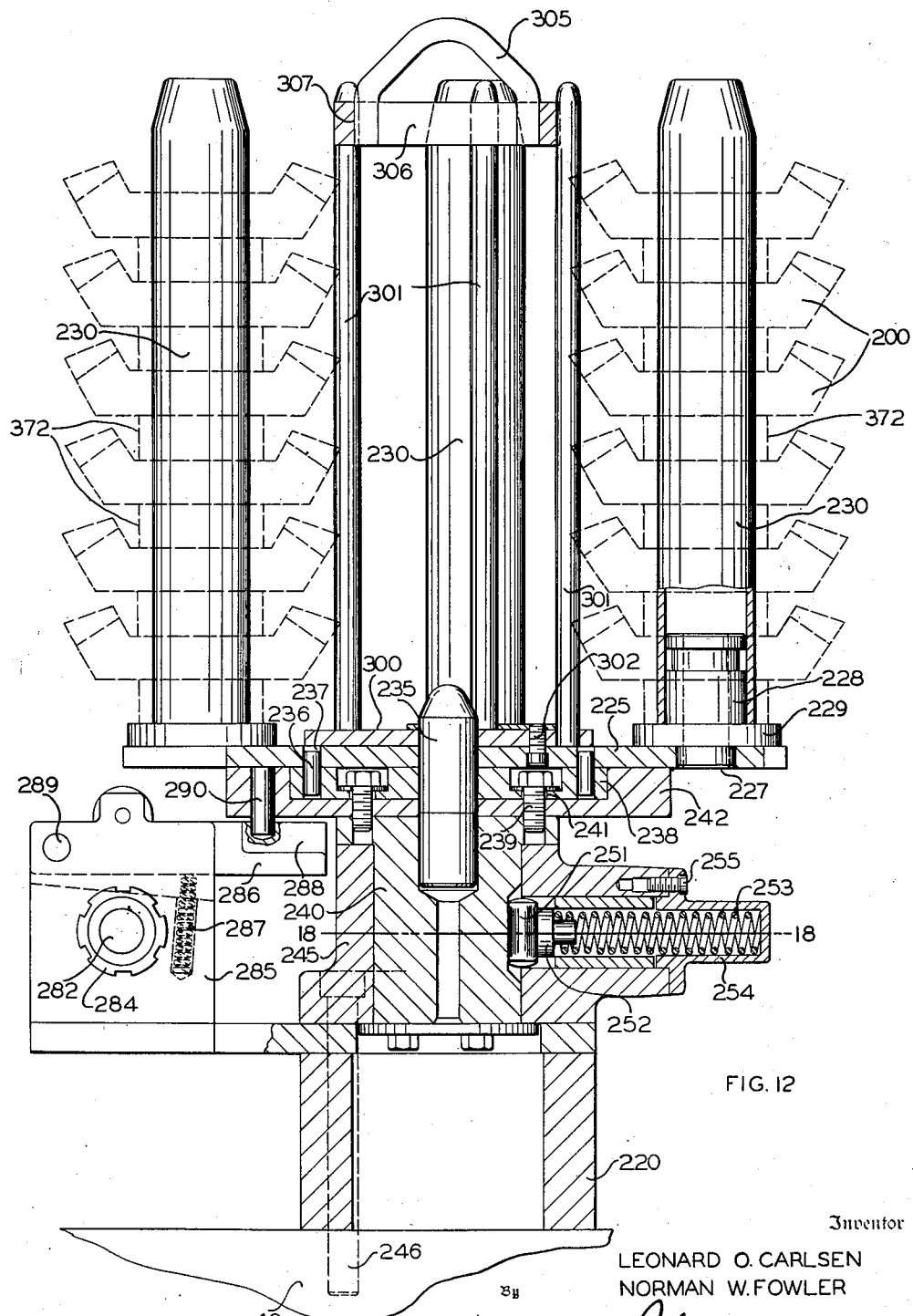
Figure 14:
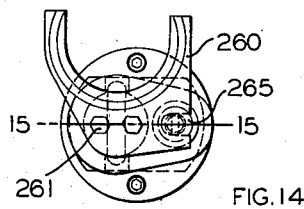
Figure 15:
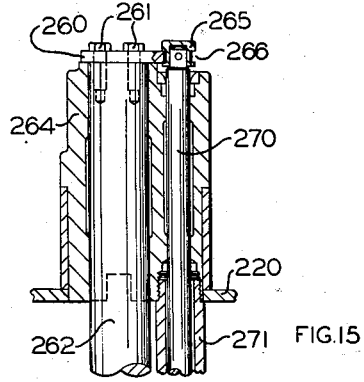
Figure 16:
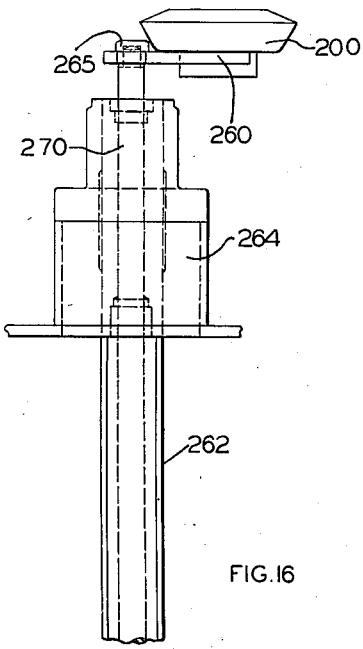
Figure 13:
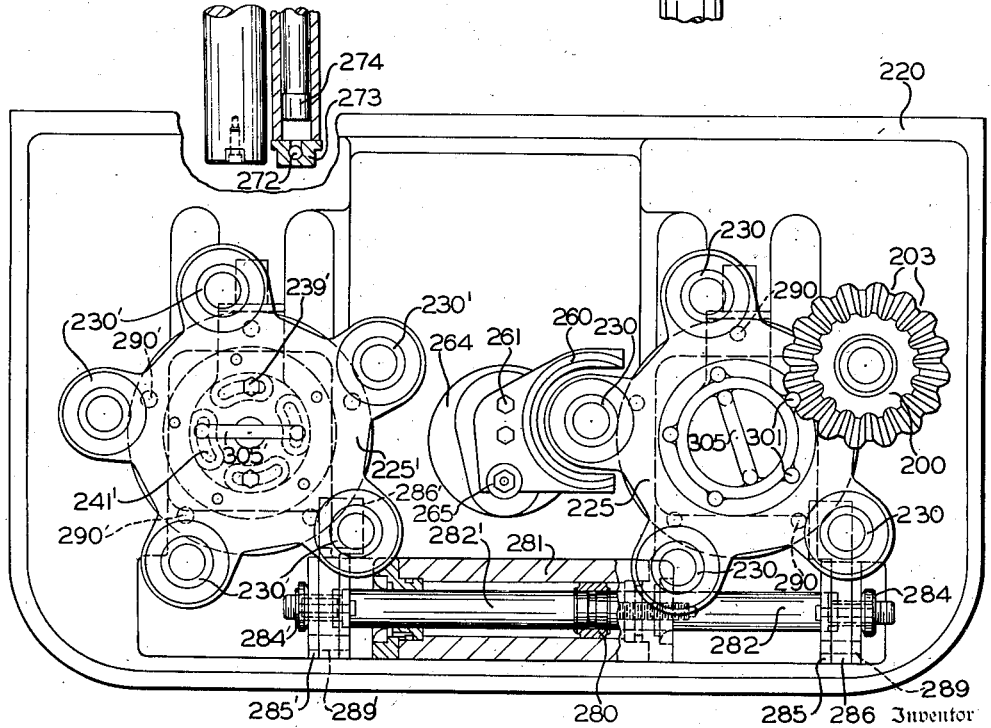
Figure 36:
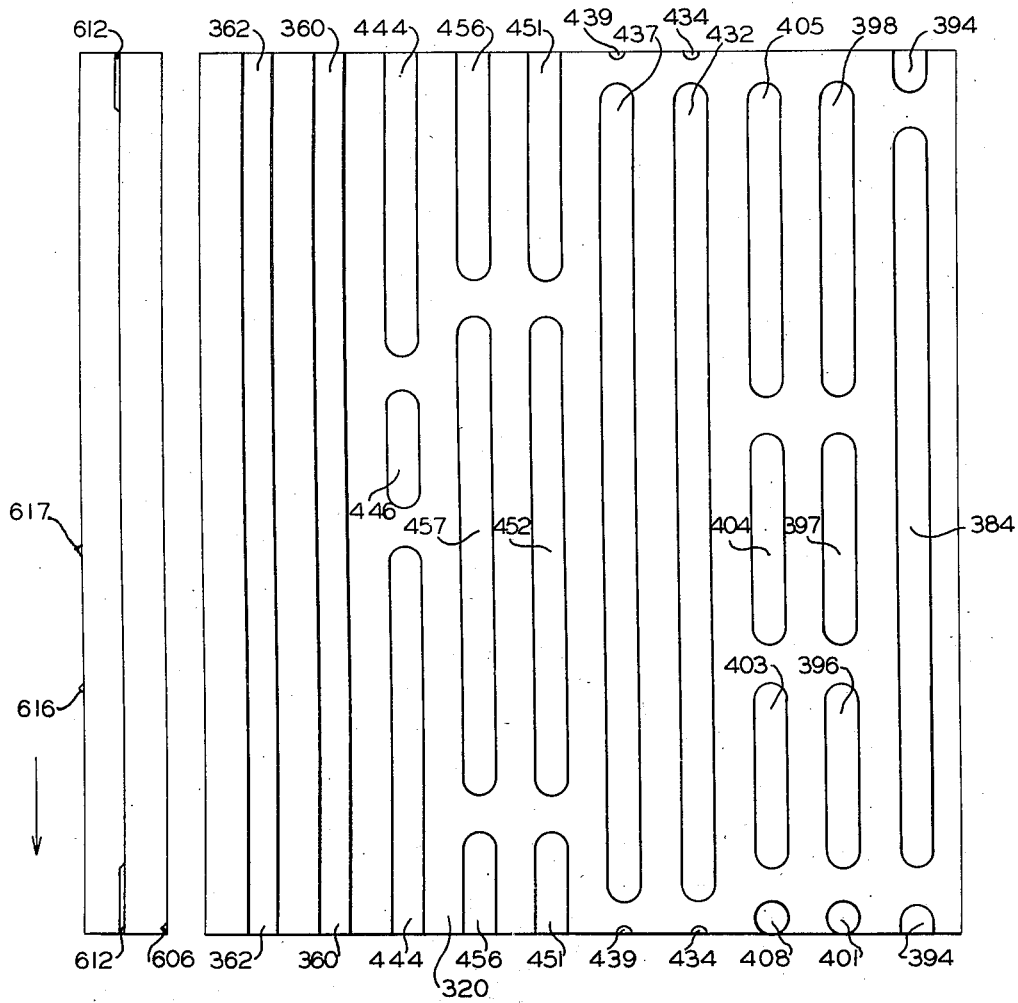
Figure 37:
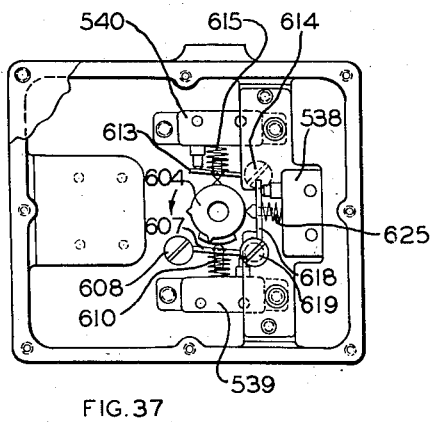
Figure 38:
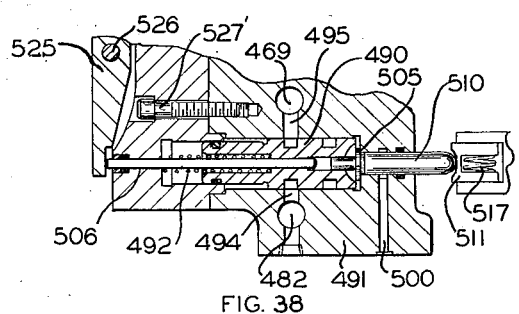
Figure 41:
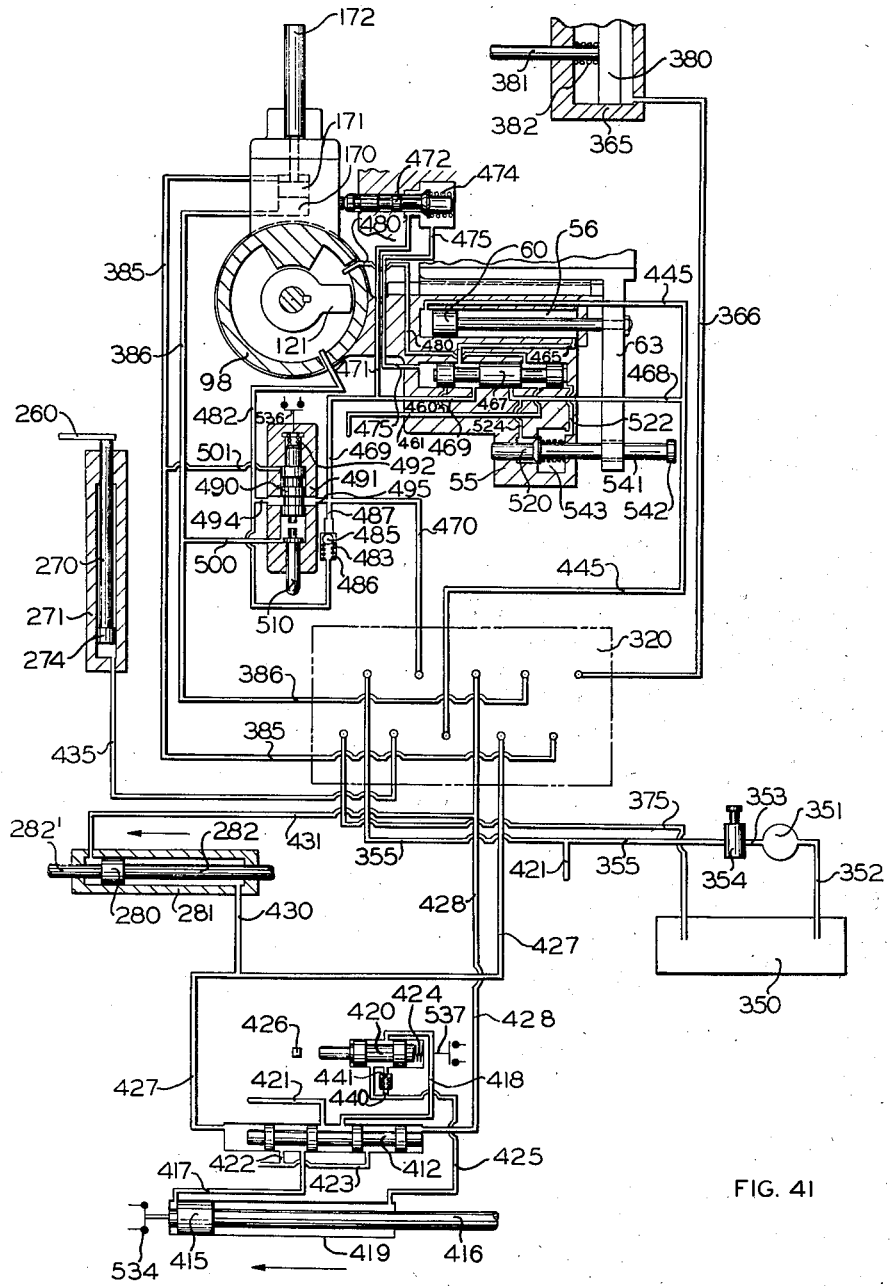
Figure 42:
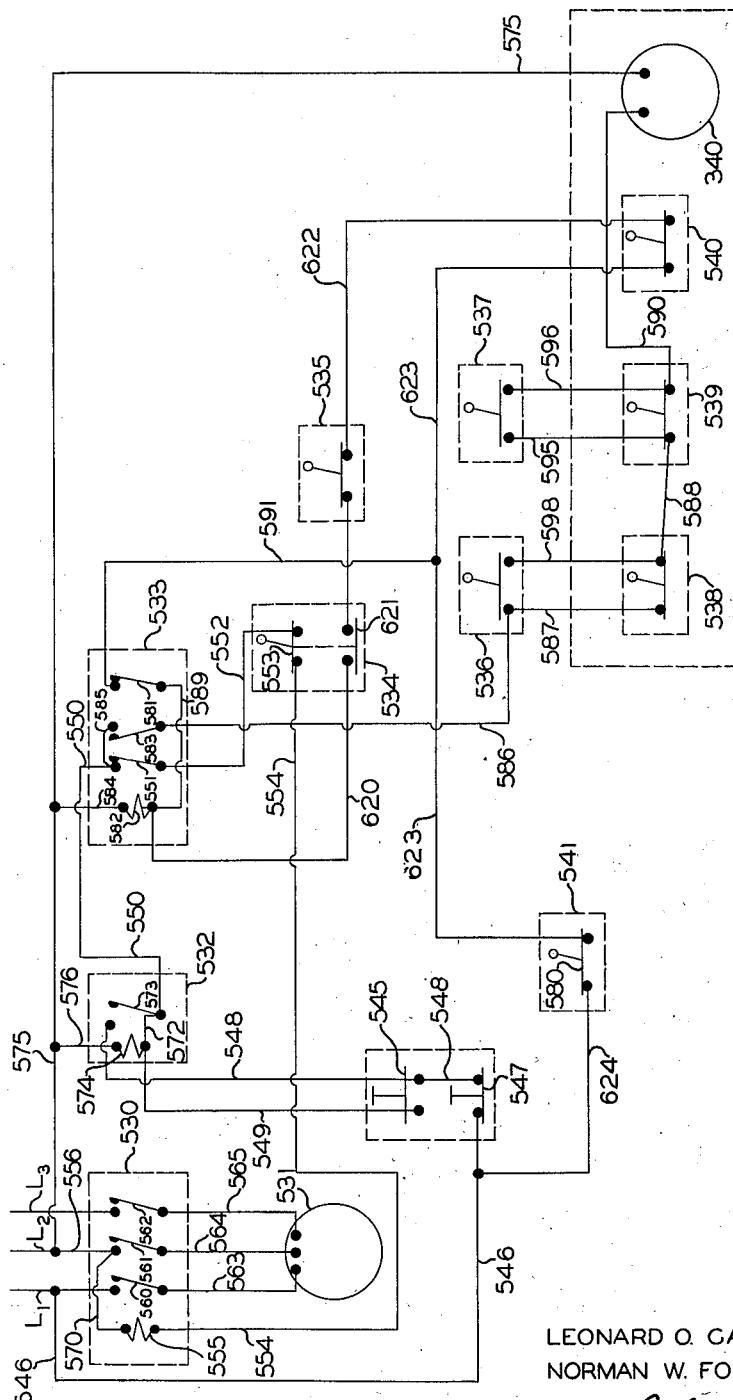

Fig. 5 is a more or less diagrammatic view showing the work spindle both in operative and in inoperative position, showing also different positions of the transfer arm and gripping jaws when the work is in operative position and in transferring a completed work piece from the work spindle to the finished magazine and in picking up a new work-piece from the supply magazine and loading this new work-piece on the work spindle, the work spindle being shown in section at loading position but in elevation at the working position;

Fig. 6 is a fragmentary view on an enlarged scale showing the mechanism for intermittently locking the swivel member on which the gripping jaws are mounted;

Fig. 7 is a view at right angles to Fig. 6 showing this swivel lock and the intermittent gear for driving the swivel member;

Fig. 8 is a section on the line 8—8 of Fig. 7, showing the intermittent gear and lock and the members which cooperate therewith;

Fig. 9 is a sectional view taken at right angles to Fig. 8, further showing the intermittent gear and pinion;

Fig. 10 is a section on the line 10—10 of Fig. 3;

Fig. 11 is an enlarged sectional view showing the rotary piston for effecting swing of the gripping jaws from pick-up position to loading position and vice versa;

Fig. 12 is a sectional view, with parts broken away, showing one of the magazines, the mechanism for indexing the same, and the means for holding it in indexed position;

Fig. 13 is a plan view showing the finished-parts and supply magazines, respectively, and showing the means which may be associated with the latter magazine to position toothed work pieces in correct angular position for picking up by the gripping jaws;

Fig. 14 is a fragmentary plan view showing the arm for lifting the work pieces in the supply magazine to move them up to position where they can be picked up by the gripping jaws;

Fig. 15 is a section on the line 15—15 of Fig. 14 showing the piston for actuating the lifting arm and the bar for guiding this piston in its movement;

Fig. 16 is a fragmentary view of this mechanism looking from the right of Fig. 15 and showing a gear being carried upwardly by the lifting arm;

Fig. 17 is a fragmentary view of the index mechanism for the supply magazine;

Fig. 18 is a section on the line 18—18 of Fig. 12 showing the detent for holding the supply magazine in any indexed position;

Fig. 19 is a fragmentary view looking at the top of the loading mechanism and showing certain of the trips and valves which control its operation;

Fig. 20 is a fragmentary view similar to Fig. 3 but showing gripping jaws of modified form such as may be employed in transferring gear blanks which have not previously been roughed out and which are therefore solid and without teeth;

Fig. 21 is a view at right angles to Fig. 20 further illustrating the structure of these gripping jaws, parts being broken away;

Fig. 22 is a sectional view through the jaws and work-piece taken at right angles to Figs. 20 and 21;

Fig. 23 is a longitudinal sectional view through the main control valve of the loading mechanism;

Fig. 24 is a longitudinal sectional view through the casing for this valve, showing the valve and the means for rotating it;

Figs. 25 to 34 inclusive are sectional views of the valve and casing taken at spaced points along the valve;

Fig. 35 is a section on the line 35—35 of Fig. 24;

Fig. 36 is a developed view of the main control valve, showing also somewhat diagrammatically the trips for various limit switches which control the operation of the loading mechanism;

Fig. 37 is a view looking at the left hand end of the valve casing as viewed in Fig. 24, part of the cover plate being broken away;

Fig. 38 is a fragmentary sectional view showing the spot valve of the loading mechanism and cooperating parts;

Fig. 39 is a fragmentary end view looking in the direction of the arrow A of Fig. 2, showing the manner in which the loading mechanism is mounted on the work head of the machine, the work head being shown only fragmentarily;

Fig. 40 is a fragmentary plan view of the base of the machine showing the means for moving the work to and from operative position;

Fig. 41 is a diagrammatic view, showing the hydraulic circuit for the fluid-pressure operated parts of the loading mechanism and machine; and Fig. 42 is a diagrammatic view showing one way in which the machine may be wired electrically to perform its functions.

The invention is illustrated as applied to a machine of the type disclosed in the pending U. S. patent application of Clarence T. Galloway, Serial No. 522,924, filed February 18, 1944, Patent No. 2,448,426, granted August 31, 1948. In this machine, a rotary disc milling cutter is employed that has a plurality of roughing blades followed by a plurality of finishing blades arranged part-way around its periphery with a gap between the last finishing blade and the first roughing blade. In operation, the cutter is rotated in engagement with the work and is simultaneously fed back and forth across the face of the work to rough-cut a tooth space of the work on feed in one direction and to finish-cut that same tooth space during feed in the opposite direction, the cutter rotating all the while in the same direction and the work being indexed when the gap in the cutter is abreast of the work. Thus, a tooth space of the work is finished on each revolution of the cutter, and, when the cutter has made as many revolutions as there are tooth spaces in the gear to be cut, the gear is finished.

In the machine of the Galloway application, the automatic stop mechanism of the machine trips when a gear is finished, and stops the machine. The operator then moves the sliding base of the machine from cutting to loading position manually so as to withdraw the completed gear from the cutter; he manually dechucks the completed gear; he manually removes the dechucked gear from the work spindle; he manually chucks the new blank; he manually causes the sliding base to be moved back into operative position again to bring the new work piece into operative relation with the cutter; and then he manually restarts the machine.

When the machine is equipped with the loading mechanism of the present invention, all these manual operations may be effected automatically. When the automatic stop trips, the sliding base is automatically withdrawn to loading position; the gripping jaws of the loading mechanism, which are already at opposite sides of the work piece, are closed to engage and grip the work piece; the work piece is dechucked; the gripping jaws then successively strip the work piece from the work spindle, swing it away from the work spindle and simultaneously rotate it into a plane at right angles to the plane which it occupies during cutting, bring it into register with one spool of a finished-parts magazine, open to drop the completed gear on this spool, and then swing further on to a position of registry with one spool of the supply magazine; the stack of work pieces on this spool is then raised to bring the uppermost work piece into registry with the jaws; the jaws are then closed to grip this new work piece, and successively are swung back to the work spindle and simultaneously turned at right angles to align the new work piece axially with the work spindle, and moved axially to load the new work piece onto the work spindle; then the new work piece is chucked; the sliding base is moved forward to bring the new work piece into engagement with the cutter; and the cutting mechanism of the machine is restarted.

Figure 1:
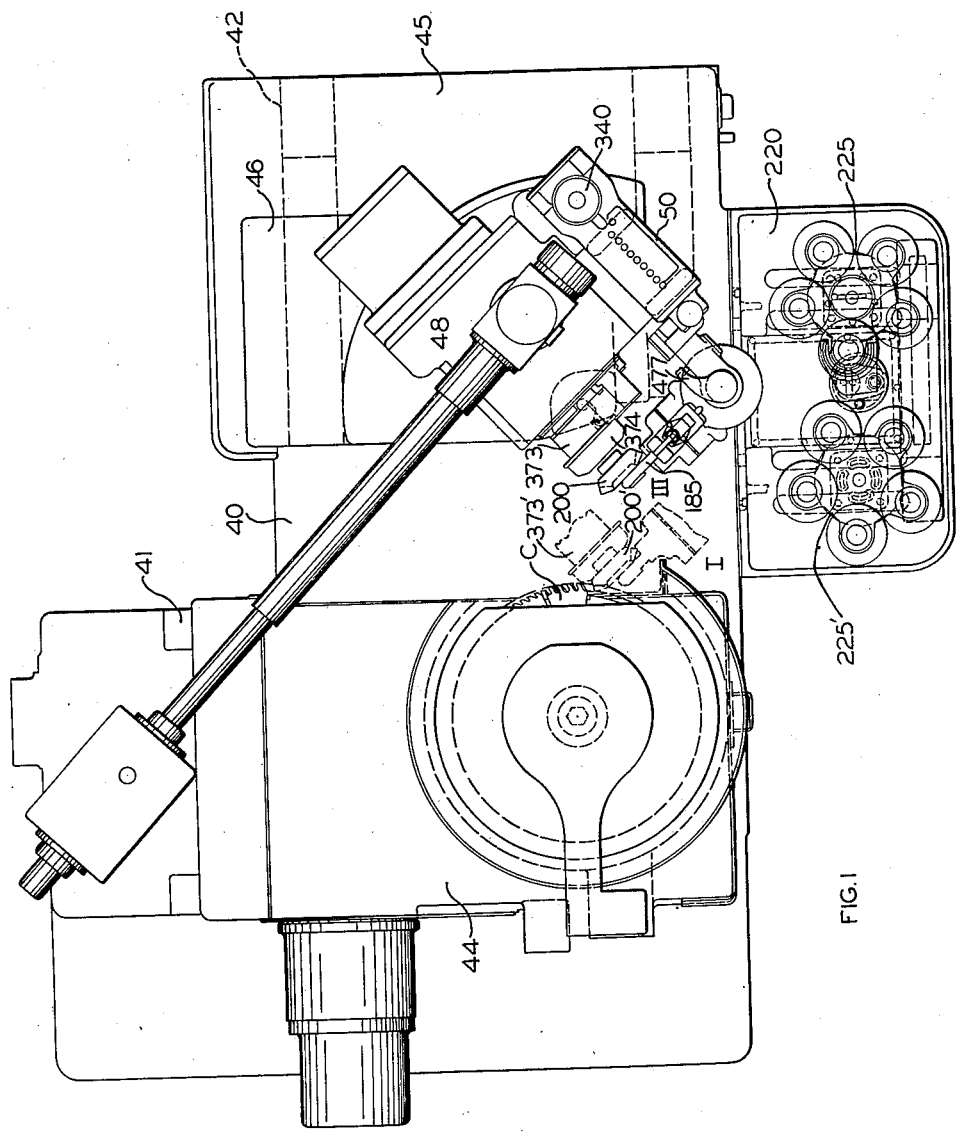
Fig. 1 is a plan view of a bevel gear cutting machine of known type equipped with a loading mechanism constructed according to one embodiment of the present invention, the work being shown in full lines in withdrawn or inoperative position, and fragmentarily in dotted lines in operating or cutting position.

In the drawings, 40 (Fig. 1) denotes the base of the machine. It is formed on its upper face with two pairs of spaced ways 41 and 42 which extend at right angles to each other. The cutter carriage 44 is mounted to reciprocate on the ways 41. The sliding base 45 is mounted to reciprocate on the ways 42.

Rotatably mounted on the cutter carriage 44 is a cutter C that may, like the cutter shown in the Galloway application above mentioned, be provided with a plurality of cutting segments which extend partway only around its periphery. In the instance shown, each segment has five cutting blades. The cutter may be built with a plurality of roughing blades followed by a plurality of finishing blades, with a gap between the last finishing blade and the first roughing blade which is of sufficient angular extent to permit indexing the gear blank, which is being cut, when the gap in the cutter is abreast of the blank, without withdrawal of the blank from engagement with the cutter; or the cutter may be provided only with roughing blades or only with finishing blades, with the indexing gap between its last and first blades.

Mounted on the sliding base 45 for rectilinear adjustment thereon in a direction at right angles to the direction of movement of the sliding base is a plate 46 and mounted on the plate 46 for angular adjustment thereon is a work head 48. All of these parts may be constructed exactly as described in the Galloway application.

Secured to one side of the work head 48 of the machine in any suitable manner is a bracket 50 (Figs. 2 and 39). Mounted on this bracket for rectilinear reciprocating movement thereon is a slide 55. The bracket has a dovetailed guideway 52 formed therein and the slide has a complementary dovetailed portion 53 which engages in this guideway. A tapered gib 54 serves to take up wear.

A cylinder 56 (Fig. 2) is formed in the slide 55. Opposite ends of this cylinder are closed by the end caps 57 and 58. Mounted to reciprocate in the cylinder is a piston 60 which has a piston rod 61 integral therewith. This piston rod projects rearwardly through the end cap 58 and is secured at its rear end by a nut 62 to a bridge member 63. The bridge member is fastened by bolts 64 to the side of bracket 50 so that the piston 60 is held stationary and the slide 55 reciprocates relative to it.

Adjustably mounted on the bottom of the slide 55 are two stop members 70 and 71 which serve to limit the movement of slide 55. These are simply cylindrical blocks which are adjustably secured to the slide by T-bolts 72 and nuts 73. The heads of the bolts 72 engage in a T-slot 74 formed in the bottom of the slide. The stop members 70 and 71 are adapted to engage, respectively, with hardened stop-pieces 75 and 76 that are secured in a projection 79 formed on bracket 50.

Integral with the slide 55 and projecting forwardly and downwardly therefrom is an arm 90 (Fig. 2). Secured to the upper surface of slide 55 by screws 92 is another arm 91. Journaled in the arm 90 is an oscillatory carrier 95. This carrier forms one end cap of a rotary cylinder 98 to which it is secured by bolts 97. These bolts also serve with cooperating nuts to secure the other end cap 100 to the cylinder. Carrier 95 and end cap 100 are journaled on anti-friction bearings 96 and 101 in the arm 90.

Secured to the carrier 95 by screws 105 is a trunnion 106. This is journaled in the arm 91 as will be described further hereinafter.

Mounted in the carrier 95 and cap 100 is a shaft 115 (Figs. 2 and 11). This shaft has splined engagement at its lower end with internal splines formed in a cap 117 that is secured by screws 118 to the arm 90. The shaft 115 is, therefore, held against rotation.

Keyed to the shaft 115 is a sleeve 120 that has an arm 121 integral with it. This arm acts as a stationary piston with reference to rotary cylinder 98. The cylinder has a partition block 123 secured on its inside wall by screws 124 and dowel pins 125. When fluid-pressure is applied to either side of the piston 121, then, the cylinder will revolve in one direction or the other to revolve the carrier 95 in one direction or the other. To prevent leakage from one side of the piston to the other, two spring-pressed packing blocks 127 and 128 are mounted in the piston arm 121 and partition block 123, respectively. The packing block 127 is pressed by coil springs 129 into tight engagement with the inside wall of the cylinder; and the packing block 128 is pressed by coil springs 130 into tight engagement with the periphery of sleeve 120.

Integral with the shaft 115 at its upper end is a flange or head portion 135 (Figs. 2 and 8). This flange has an upper face 136 (Figs. 6 and 8) lying in a plane perpendicular to the axis of the shaft and it has a notch 137 formed therein (Figs. 6 and 7). Secured within the head 135 by screws 138 is an intermittent bevel gear 140 (Figs. 7 to 9 inclusive). This gear seats within the head 135 on a gasket 142 and is coaxial with shaft 115. This gear has two teeth 141 only. It is adapted to mesh intermittently during oscillation of the carrier 95 with an intermittent bevel pinion 145 that has teeth 146 formed only partway around its periphery.

The pinion 145 is keyed to a shaft 148 and to this same shaft is keyed a locking collar 150 (Figs. 2, 6, and 8). This collar has two slabbed-off plane surfaces 151 and 152 that are adapted to cooperate with the plane upper face 136 of head 135 to lock shaft 148 against rotation during part of the oscillation of carrier 95. The collar member is also provided intermediate the chordal surfaces 151 and 152 with a tongue or projection 154 which is adapted to fit into groove 137 in the flange 135 to permit rotation of the shaft 148 through a slight angle. This groove is so located that tongue 154 engages in it when the teeth 141 of gear 140 mesh with the teeth 146 of pinion 145.

Shaft 148 is journaled at front and rear ends in the carrier 95 on anti-friction bearings 160 and 161, respectively (Fig. 2). It is supported intermediate its ends by a block 162 which is doweled to the trunnion 106 and which rests on gasket 142. It is enlarged in diameter at its forward end.

Formed centrally in the enlarged head portion of the shaft 148 is a cylinder 170 in which is mounted a reciprocable piston 171. This piston has a piston rod 172 integral with it which projects forwardly through an end cap or packing 173 that closes the forward end of the cylinder 170.

Mounted on the carrier 95 and held thereon by a ring 181 is a head 180. Pivotally mounted in the head 180 by means of pins 182 (Figs. 3 and 10) are two scissor members 185. These are journaled on anti-friction bearings 183 and 184 in head 180. These scissor members or arms 185 are of the bell-crank type. At their forward or outer ends they carry removable gripping jaws 190 (Figs. 2, 3, and 4). At their inner ends these arms 185 are forked to engage pins 195 (Figs. 3 and 10) that are secured in a block 196. This block is secured to the forward end of the piston rod 172.

The jaws 190 are secured by screws or other suitable means (not shown) to the scissor arms. They may be of any suitable shape to conform to the shape of the work. Where bevel gears 200, such as shown in Figs. 3 and 4, are to be cut on the gear cutting machine, the jaws 190 are shaped with surfaces 204 and 205 complementary to the top and end faces 202 and 206, respectively, of the teeth 201 of the gear, so that when the jaws grasp the gear, it cannot fall out of the jaws even when they are turned through 90° in the transfer operation as will be hereinafter described.

When the gears are already rough-cut or toothed, the jaws also have spring-pressed plungers 207 movably mounted in them. These plungers are adapted to engage in the tooth space 203 of the gears, to act as stock dividers to properly locate each work piece angularly so that when it is placed on the work spindle of the machine it will be located angularly in proper position so that the cutting tool C of the machine will enter a tooth space of the work and remove stock correctly from opposite sides of the roughened tooth space. The plungers are mounted on the insides of the jaws and pressed outwardly, that is, towards one another, by coil springs 209. The plungers are shaped, of course, to suit the job to be cut on the machine.

There is a plate 210 secured to the head 180 which acts as a stop or seat. It serves to stop upward movement of the uppermost gear on the stack of blanks in the supply magazine, as will be described hereinafter, when that gear is being picked up by the jaws, thereby positioning the gear properly axially for loading. The plate 210 is slotted or furcated as shown clearly in Figs. 2 and 3, so that it will not interfere with the cutter during cutting of a gear. It is connected to the head by struts 212 (Figs. 21 and 22).

Secured to the base 40 of the machine at one side thereof is a bracket 220 (Figs. 1, 5, 12 and 13) on which are mounted the supply magazine and the finished-parts magazine. The two magazines are similar in construction and for that reason the structure of only the supply magazine will be described in detail. Like parts of the two magazines will be designated by the same reference numerals, but in the case of the finished-parts magazine these reference numerals will be primed.

The supply magazine comprises a plate 225 (Fig. 12) that has a plurality of equi-angularly spaced posts 228 mounted thereon. These posts fit into equi-angularly spaced holes 227 formed in the plate. There are five such posts in the instance shown. Each post forms a support for a tube or spool 230. Each tube or spool seats against a collar or flange 229 formed on the related post 228. In the case of the supply magazine, a plurality of gear blanks 200 are stacked on the tubes. The tubes 230' of the finished-parts magazine are adapted to receive the finished work pieces. The diameter of the tubes is slightly less than the diameter of the bores of the work pieces.

The plate 225 is mounted coaxial with a shaft 240 by means of a centering pin 235, and is held against rotation relative to the shaft by pins 236 which engage in holes 237 formed in the plate. The pins 236 are carried by a disc 238. This disk seats in a recess in a plate 242. Disc 238 and plate 242 are adjustably secured by bolts 239 to the enlarged head of shaft 240. The bolts 239 pass through arcuate slots 241 formed in the plate 238 coaxial with the shaft. The shaft 240 is journaled in a collar 245 which is secured by screws 246 to the base 40 of the machine. These bolts 246 serve, also, to secure the bracket 220 to the base.

The shaft 240 is provided with a plurality of V- shaped notches 250 (Fig. 18) around its periphery. It is normally held against rotation by a pin 251. This pin is constantly urged to locking position by a spring-actuated plunger 252 which is constantly pressed inwardly by a coil-spring 253. The plunger and spring are housed in a cylinder 254 which is secured by screws 255 to one side of housing 245.

In each loading operation, a blank is picked off one of the tubes or spools 230 of the supply magazine and transferred to the work spindle of the machine. The magazine is indexed about the axis of shaft 240 after each loading operation so that a blank is picked off a different one of the five spools 230 successively. As a blank is picked off each spool, the number of blanks on that spool is, of course, reduced. Therefore, on each pick-up operation the stack of blanks on each spool has to be raised to bring the topmost blank on the spool into registry with the gripping jaws. This lifting mechanism will now be described.

It comprises a fork 260 (Figs. 13, 14, 15, and 16) which is adapted to straddle the tube 230 that is at the time in pick-up position. The fork is secured by screws 261 to a guide post or bar 262. The bar 262 is mounted to reciprocate in a housing 264 which is fastened in any suitable manner to bracket 220. The fork 260 is also notched at one side to engage in a recess 266 of the head 265 of a piston rod 270 so that movement of the piston-rod is transmitted to the fork.

The piston-rod 270 extends parallel to guide post 262 and is integral with a piston 274 which is mounted to reciprocate in a cylinder 271 which is secured to housing 264. The housing 264 itself is also bored to guide the piston-rod in its movement. Fluid under pressure may be admitted to or exhausted from the lower end of cylinder 271, through a port 272 in end cap 273.

In each transfer cycle, a completed gear is first taken off the work spindle of the machine by the gripping jaws 190 and dropped on one of the spools 230' of the finished-parts magazine. Then the transfer mechanism is moved on into registry with one of the spools 230 of the supply magazine; and the gripping jaws pick up the topmost blank from that spool and transfer it to the work spindle.

The bevel gears 200 shown in the drawings, which are the work pieces of the machine, have short hubs 372. When the port 272 is on supply, the piston 274 is forced upwardly to raise fork 260 to engage the fork around the hub 372 and under the back face of the lowermost gear 200 of the stack on the spool 230 that is then in registry with the fork. Thereby that gear and any above it are lifted on the related spool 230 to cause the topmost gear in the stack to be brought between the gripping jaws 190 so that when the gripping jaws are closed they grasp the gear. Upward movement of the stack is limited by stop-plate 210. The fork 260 is normally below plate 225; and that is the position to which it is returned after a transfer operation, so that the magazine can be indexed without interference by the fork.

The finished-parts magazine, like the supply magazine, is indexed on each cycle of operation of the loading mechanism. Thus, a different spool 230' of the finished-parts magazine is in position to receive the completed gear and a different spool 230 of the supply magazine is in position to supply the new gear blank on each loading cycle. The indexing mechanisms of the two magazines are alike, and both indexing mechanisms are actuated from the same source. The indexing mechanisms for the two magazines will now be described.

Mounted to reciprocate in a cylinder 281 (Fig. 13), that is provided on the bracket 220, is a piston 280. This piston has two piston rods 282 and 282' secured to opposite ends thereof to which are fastened blocks 285 and 285', respectively. The blocks are held in place by nuts 284 and 284' which thread onto the ends of piston rods 282 and 282', respectively.

There are five equi-angularly spaced pins 290 (Figs. 12 and 13) secured in plate 242, and five similar pins 290' secured in plate 242'. The indexing mechanisms are similar in construction and only one need be described in detail. Suffice it to say that one indexing mechanism cooperates with pins 290 to effect indexing of the supply magazine while the other indexing mechanism cooperates with pins 290' to effect indexing of the finished-parts magazine, and that indexing of both magazines is effected on stroke of piston 280 in one direction while re-setting of the index mechanism is effected on stroke of piston 280 in the opposite direction. Like parts of the two indexing mechanisms are designated by the same reference numerals but the numerals denoting parts of and parts associated with the indexing mechanism for the finished-parts magazine are primed.

Pivotally mounted in block 285 on a pin 289 is a laterally-projecting arm 286 (Figs. 12 and 17). This arm is constantly spring-pressed upwardly by a coil spring 287. The upper face of the arm 286 is slabbed off to provide an inclined surface 288. On each forward stroke of piston 280, the pin 290, which is in the path of movement of arm 286, rides up on this inclined surface 288 and idly over it, the spring 287 permitting the arm to be depressed. This pin 290 thus gets behind arm 286. On the return stroke of piston 280, the arm 286 engages this pin 290 to rotate the supply magazine and effect indexing of that magazine.

During the indexing of the supply magazine, pin 251 (Figs. 12 and 18) rides out of the notch 250 with which it has previously been engaged and enters the next notch, thereby relocking the shaft 240 and supply magazine at the end of the indexing movement. Similar unlocking and relocking of the finished-parts magazine occurs during indexing of that magazine.

When previously roughed gear blanks are to be cut on the machine, such as the blanks shown at 200 in Figs. 3 and 4, it is desirable to provide some means for angularly positioning the gear blanks in each stack on the spools 230 so that diametrically opposite tooth spaces of each blank will be in position for the plungers 207 to enter them when each is gripped by the jaws 190. This preliminary stock-dividing mechanism may comprise five parallel equi-angularly spaced rods 301 (Figs. 12 and 13) which are secured in a plate 300 that may be fastened to plate 225 by screws 302 (Fig. 12). There is one rod 301 associated with each spool 230. The rods 301 are made of a diameter to engage in the tooth spaces 203 of the gear blanks. Thus, as each gear blank 200 is placed upon a tube or spool 230 in the loading of the supply magazine, the pin 301 associated with that tube will engage in one of the tooth spaces of the blank and locate that blank angularly on the spool in position to be engaged readily by the plungers or fingers 207 of the gripping jaws.

Both the supply and finished-parts magazines are removable from the machine, the one for replacement by a magazine with a new supply of blanks and the other for dumping of the finished gears. For lifting the magazines on and off the machine, handles or bails 305 and 305', respectively, are provided. The handle or bail 305 is secured to a ring 306 that engages in recesses 307 formed in the pins 301. The handle or ball 305' is secured in similar manner to pins 301'.

The operations of transferring the completed gear to the finished-parts magazine and of transferring a blank from the supply magazine to the work spindle of the machine, after the gear-cutting operation has been completed, are controlled by a rotary control valve and a series of limit switches.

The rotary valve is shown at 320 in Figs. 23 to 35 inclusive and a layout of this valve is shown in Fig. 36. This valve is rotatable in a casing 321 and is journaled therein on anti-friction bearings 322 and 323. The valve may be automatically or manually operated.

For manual operation a lever 324 having a knob 325 is provided. This lever has a hub portion which fits over the stem part 328 of the valve. It is adapted to be connected to the valve by a pin 326 which is slidably mounted in the lever and which is adapted to engage at its lower end in a recess 327 formed in the stem part 328 of the valve. The pin 326 is adapted to be held in locking position by a coil spring 331. There is a bayonet slot 329 formed in the lever arm 324, however, and the pin 326 has a handle 330 secured to it which projects through this slot and which, when engaged in the horizontal portion of the slot, serves to hold the pin 326 in disengaged position. By pulling up on the handle 330 against the resistance of the spring 331, then, the handle may be located in the horizontal portion of the slot 329; and the pin 326 may be withdrawn from engagement with the recess 327 in the stem 328 to allow automatic operation of the valve. The spring 331 is housed in lever arm 324.

In the automatic operation of the machine, the valve 320 is adapted to be driven by an electric motor 340 which is mounted on the valve casing 321 and which drives the valve through a bevel pinion 341 and a bevel gear 342. The pinion is connected to the armature shaft of the motor by a suitable coupling. The gear is secured by a suitable coupling and by a nut 344 to the valve. Spring pressed friction blocks 345 that are actuated by springs 346 serve to apply braking pressure to the gear 342 and provide a drag at all times upon the rotation of that gear sufficient to take up backlash.

Motive fluid is supplied to the valve 320 from the sump 350 of the machine (Fig. 41) by a pump 351, the fluid being drawn from the sump through a duct 352 and conducted to the valve 320 through a duct 353, a relief valve 354, and a duct 355. The duct 355 connects with a port 356 (Figs. 24 and 26) in the valve casing 321. This port communicates with a groove 360 formed on the periphery of the valve 320. A duct 357, which extends diametrically through the valve, communicates with this groove 360. This duct leads to a duct 358 that extends longitudinally through the valve.

The motive fluid is exhausted from the valve casing 321 through a port 361 (Fig. 25) which communicates with a groove 362 formed around the periphery of the valve and at the left of and spaced from groove 360. The groove 362 communicates with two angularly spaced radial ducts 363 and 364 that in turn lead into two ducts 367 and 368 that extend longitudinally of the valve parallel to each other and to duct 358. The port 361 is connected with a duct 375 (Fig. 41) that leads back to the sump 350 of the machine.

The work is adapted to be chucked on the work spindle 370 (Fig. 5) of the machine by any suitable type chucking mechanism, preferably fluid-pressure operated so that its operation may be timed to the operations of the transfer mechanism. The work spindle is, of course, suitably journaled in the work head 48 of the machine for indexing of the work after the cutting of each tooth space as described in the Galloway application above mentioned.

In the instance shown, the chucking mechanism comprises a pot-type chuck 371 of the contractible collet type whose fingers are adapted to be contracted, on rearward movement of the chuck, to engage the hub 372 (Fig. 4) of the gear blank 200 which is to be cut. The chuck 371 is mounted in an arbor 373 which is mounted within the bore of the work spindle 370. The nose of the arbor is denoted at 374. This is secured by screws 376 to a ring member 377 which in turn is secured by screws 378 to arbor 373. Ring member 377 has a conical bore to cooperate with the conical outer surfaces of the collet fingers of chuck 371 whereby, when the chuck is pulled rearwardly in arbor 373, the collet fingers will be compressed to grip the hub 372 of the work. When the chuck is moved forwardly, of course, the work will be released.

The chuck is connected through its stem portion 379 by any suitable coupling means with a drawbar 381 that is secured to a piston 380 (Fig. 41). The piston 380 is mounted to reciprocate in a cylinder 365. This piston is normally urged rearwardly to hold the collet in chucking position by a coiled spring 382. The piston is adapted to be moved forwardly to release the chuck by application of fluid-pressure to the rear face of the piston.

There is a headed member 630 secured in the stem portion 379 of the collet. Its head fits between the collet fingers behind the hub 372 of the gear 200. It has a stem which is mounted in the stem of the collet. A coil spring 632 pushes the head of this member forward to keep dirt and chips out of the collet fingers. A set-screw 631 which engages in a slot in the stem of this member, serves to limit its forward movement.

The pressure fluid is supplied to and exhausted from the cylinder 365 through a duct 366. This duct is connected to a port 383 (Fig. 34) in valve casing 321. The valve 320 is formed, at the part of it which registers with port 383, with two axially aligned grooves 384 and 394 each of which extends only part way around the periphery of the valve, the groove 384 being of by far the greater angular extent.

The groove 384 can communicate through a radial duct 387 with central supply duct 358 (Figs. 23 and 24) but connection between the two ducts 387 and 358 is normally closed off by a spring-pressed ball check-valve 388. This valve is adapted to seat against a seating member 389 that is mounted in duct 358. It is normally held closed by spring 390 which is interposed between the plunger 386, which holds the check-valve, and the stem 328 of rotary valve 320.

The groove 394 communicates through a radial duct 391 with a duct 392 that extends through valve 320 longitudinally parallel to and offset from duct 358 but in axial alignment with duct 367. The left and right hand ends of ducts 392 and 367, respectively, are closed by plugs 409 and 410. Duct 392 communicates with exhaust duct 368 through a circular groove 393 (Figs. 23 and 35), that extends around valve stem 328.

When the valve 320 is in position, then, where groove 384 communicates with port 383 (Fig. 34) the pressure fluid entering the valve casing 321 through port 356 (Fig. 26) is supplied to cylinder 365 (Fig. 41) through ducts 357 and 358 (Fig. 26), check-valve 388 (Fig. 23), duct 387 (Figs. 23 and 34), groove 384, port 383, and duct 366 (Fig. 41), thus releasing the chucking mechanism. When the valve 320 is in the position, however, where groove 394 communicates with port 383, then the cylinder 365 is on exhaust through duct 366, port 383, groove 394, ducts 391 and 392 (Figs. 34 and 23), groove 393, ducts 368 and 364 (Fig. 25), groove 362, port 361, and duct 375 which leads back to the sump. Then the work is chucked.

Opposite sides of the cylinder 170 (Figs. 2 and 3), which house the piston 171 that operates the scissors mechanism for actuating the gripping jaws, are connected with the valve 320 by ducts 385 and 386 (Fig. 41). The duct 385 connects with a port 395 (Figs. 33 and 24) in the valve casing 321. The portion of the valve 320, which registers axially with port 395, is provided with three grooves 396, 397 and 398. Each of these grooves extends only part-way around the periphery of the valve. Groove 396 connects through radial duct 399 with central longitudinal supply duct 358. Groove 397 connects through radial duct 400 with longitudinal exhaust duct 368. Groove 398 connects through a radial duct 414 with a longitudinal supply duct 358. There is also a duct 401 provided in valve 320, which can communicate with port 395 and which communicates with exhaust duct 392.

The duct 386 connects with a port 402 (Fig. 32) in valve casing 421. The portion of the valve, which is axially in register with port 402, is formed with three peripheral grooves 403, 404, and 405. Each of these grooves extends only part-way around the periphery of the valve. Groove 404 is connected by a radial duct 406 with the longitudinal pressure duct 358. This duct may also communicate with port 402 by a radial duct 408 which is almost diametrically opposite radial duct 406. Groove 403 is connected by a radial duct 407 with the longitudinal exhaust duct 368. Groove 405 connects through a radial duct 411 with a longitudinal duct 413, that is parallel to longitudinal ducts 392, 358 and 368. This duct 413 communicates with groove 393 (Figs. 23 and 35) but extends from that groove only part way the length of the valve 320 to a point just slightly to the left of port 402 (Figs. 24 and 32).

When the valve 320 is in the position shown in Figs. 33 and 34, the line 386 (Fig. 41) is on supply from pressure duct 358 through duct 408, and port 402 (Fig. 32), while the line 385 is on exhaust through port 395, ducts 401 and 392 (Fig. 33), groove 393 (Figs. 23 and 35), duct 368, groove 362 (Fig. 25), port 361, and duct 375 (Fig 41). In this position, piston 171 (Figs. 41, 2 and 3) is forward in its cylinder 170 and the transfer jaws 199 are open.

As the valve 320 is rotated clockwise in Figs. 32 and 33, grooves 396 and 403 are brought into registry with ports 395 and 402, respectively, duct 385 (Fig. 41) is put on supply and duct 386 is put on exhaust. This causes the clamping jaws to be moved to clamping position. In the further rotation of the valve, the jaws are opened again when groove 397 registers with port 395 and groove 404 with port 402. Thereby port 395 is put on exhaust through groove 397, duct 400, and duct 368, while port 402 is put on supply from duct 358 through duct 406 and groove 404. When the valve 320 has rotated still further, the jaws are closed again when groove 398 registers with port 395 and groove 405 registers with port 402. Thereby port 395 is put on supply through groove 398, and ducts 414 and 358, while port 402 is put on exhaust through groove 405, ducts 411 and 413 (Fig. 32), groove 393 (Figs. 23 and 35), and duct 368.

The clamping jaws close to grip the work at the completion of a cutting operation thereon, hold the work during transfer, open to release the completed work piece when the clamping jaws are in registry with one of the spools of the finished-parts magazine, close again when they are in registry with a new blank at the supply magazine to grip that blank and carry it to the work spindle, and open again when the blank has been chucked on the work spindle, all as will be described more particularly hereinafter.

Loading of the blank on the work spindle of the machine, and removal of a completed gear from the work spindle are done with the sliding base of the machine withdrawn to loading position. For movement of the sliding base from loading to cutting position and vice versa, a piston 415 (Fig. 41) is provided. This piston reciprocates in a cylinder 419 (Fig. 40) that is fastened to the base 40 of the machine. It is connected by piston rod 416 with the sliding base 45. This connection may be an adjustable connection according to conventional practice.

The movements of the sliding base are controlled by rotary valve 320. The valve 320 is connected by ducts 427 and 428 (Fig. 41) with opposite sides of a valve 412 which controls the movement of the piston 415. The valve 412 is connected with one side of the piston 415 by a duct 417. It is connected with a dash-pot valve 420 by a duct 418. A duct 425 connects the dash-pot valve 420 by a duct 418. A duct 425 connects the dash-pot valve 420 with the opposite side of the piston 415. The valve 412 is connected with the pressure line 355 by a duct 421. Exhaust ducts 422 and 423 connect the valve 412 with the sump.

The dash-pot valve 420 is mounted on the base 40 of the machine. A coil spring 424 constantly urges it into the position shown in Fig. 41. It is adapted to be moved in the opposite direction by a block 426 secured to the sliding base 45. In its movement in the latter direction it trips a limit switch 537 for a purpose which will hereinafter appear.

Duct 427 is connected with a port 429 (Fig. 31) in valve casing 321. The portion of the valve 320, which is opposite port 429, is provided with a groove 432 which extends around the greater portion of the periphery of the valve. A radial duct 433 connects this groove with longitudinal exhaust duct 368. There is also a second radial duct which may register with port 429 in the rotation of the valve 320. This duct is designated 434. It is adapted to connect port 429 with longitudinal pressure duct 358.

Duct 428 is connected with a port 436 (Fig. 30) in valve casing 321. The portion of the valve 320, which is opposite port 436, is provided with a groove 437 which extends around the greater portion of the periphery of the valve. A radial duct 438 connects this groove with longitudinal pressure duct 358. There is also a second radial duct in this portion of the valve 320 which may register with port 436 in the rotation of the valve. This duct is designated 439. It is adapted to connect port 436 with longitudinal exhaust duct 367.

When the valve 320 is in the position shown in Figs. 30 and 31, the pressure fluid is supplied to line 427 (Fig. 41) from duct 358 (Fig. 31) through duct 434 and port 429, and it flows to the left hand end of valve 412 (Fig. 41) to hold the valve in the position shown in Fig. 41. At this time the right hand end of the valve casing is on exhaust through line 428, port 436 (Fig. 30) and ducts 439 and 367. When valve 320 is rotated to connect grooves 432 and 437 with ports 429 and 436, respectively, line 428 (Fig. 41) is put on supply from duct 358 (Fig. 30) through duct 438, groove 437 and port 436, while line 427 is put on exhaust through port 429 (Fig. 31) groove 432, and ducts 433 and 368. This causes valve 412 to be shifted to the left from the position shown in Fig. 41.

When valve 412 is in the position shown in Fig. 41, the pressure fluid flows from line 421 through line 418 and line 425 into the right hand end of cylinder 419 to hold piston 415 in the position shown in Fig. 41 with the sliding base 45 in cutting position. The pressure fluid enters line 425 through valve 420 in two ways, namely, directly, and through a line 440 which contains a ball-check valve 441 which is normally held closed by spring pressure but is opened by the fluid pressure. In the position shown in Fig. 41, the left hand end of cylinder 419 is on exhaust through ducts 417, 422 and 423. In this position, also, a limit switch 534 is tripped by piston 415 for a purpose which will hereinafter appear.

When valve 412 is shifted to the left from the position shown in Fig. 41, line 417 will be put on supply from duct 421, while duct 425 will be on exhaust through lines 418 and 423. Ball-check valve 441 will be closed so line 440 will be shut off. Toward the end of the travel of piston 415 to the right, however, that is, toward the end of the movement of sliding base 45 to loading position, stop 426 will contact dash-pot valve 420 and move it to the right gradually closing off duct 425, thus dash-potting the movement of piston 415 and bringing it to a gradual stop.

The lines 427 and 428 are connected not only with valve 412 but also with opposite sides of the piston 280 (Figs. 13 and 41), which actuates the index mechanism of the supply and finished-parts magazine. The connections are through ducts 430 and 431, respectively.

When valve 320 is in the position shown in Figs. 30 and 31, then, the pressure fluid will be supplied to the right hand end of cylinder 281 from longitudinal duct 358 through duct 434, port 429, and ducts 427 and 430, while the left hand end of cylinder 281 will be on exhaust through ducts 431 and 428, port 436, and ducts 439 and 367. This will cause piston 280 to be moved to the left as shown to index the magazines. When the valve 320 is rotated, however, to bring grooves 437 and 432 into registry with the ports 436 and 429, respectively, then duct 431 (Fig. 41) will be put on supply from longitudinal duct 358 (Fig. 30) through duct 438, groove 437, port 436 and duct 428, while duct 430 will be put on exhaust through duct 427, port 429 (Fig. 31), groove 432, duct 433 and duct 368. This will cause piston 280 to be moved to the right to effect resetting of the index mechanism for the magazines.

The cylinder 271, which contains the piston 270, that serves to lift the blanks in the supply magazine up into registry with the gripping jaws, is connected by a duct 435 with the casing of the valve 320. Duct 435 communicates with port 443 (Fig. 27) in valve casing 321. The portion of the valve 320 opposite this port is formed with two angularly spaced grooves 444 and 446. A radial duct 447 leads from groove 444 to exhaust duct 367. A radial duct 448 connects groove 446 with supply duct 358.

When the valve 320 is in the position shown in Fig. 27, the line 435 will be on exhaust through port 443 and ducts 447 and 367. Thus the piston 270 will be free to drop down to the position shown in Figs. 41 and 15 under the influence of gravity. When valve 320 is rotated, however, to bring groove 446 (Fig. 27) into registry with port 443, then duct 435 (Fig. 41) will be put on supply from duct 358 (Fig. 27) through duct 448, groove 446, and port 443. This will cause the piston 270 to rise to lift the blank or blanks, which are on the spool 230 that is in registry with the gripping jaws, so that the uppermost blank of that stack will be registered with the jaws in position to be gripped thereby upon closing of the jaws.

One side of the piston 60 (Figs. 2 and 41) is connected to the valve 320 by a duct 445. This piston is held stationary and cylinder 56 moves on it, effecting the rectilinear axial movements of the work to and from the work spindle. The duct 445 communicates with a port 450 (Fig. 29) in valve casing 321. The portion of valve 320 opposite this port is provided with two angularly spaced grooves 451 and 452. These grooves extend part-way only around the periphery of the valve. Groove 451 is connected by a radial duct 453 with exhaust duct 367. Groove 452 is connected by a radial duct 454 with supply duct 358.

The direction of movement of the cylinder 56 with reference to piston 60 is controlled by a valve 467 (Figs. 2 and 41). The cylinder is connected with this valve by a duct 465. The valve 467 reciprocates in a bore 466 drilled in the slide 55. It is connected by a duct 468 with duct 445 and by a duct 469 with a duct 470. The last-named duct communicates with a port 455 (Fig. 28) in the valve casing 321.

The portion of valve 320, which is axially opposite port 455, is provided with two angularly spaced grooves 456 and 457, each of which extends only part-way around the periphery of the valve. Groove 456 is connected with supply duct 358 by a radial duct 458. Groove 457 is connected with exhaust duct 368 by a radial duct 459.

When the valve 467 is in the position shown in Fig. 41 and the valve 320 is in the position shown in Figs. 28 and 29, the pressure fluid is supplied to the right hand face of piston 60 from duct 358 through duct 458, groove 456, port 455, and ducts 470, 469, and 465, while the left hand side of the cylinder 56 (Fig. 2) is on exhaust through duct 445, port 450 (Fig. 29), groove 451, and ducts 453 and 367. When the valve 467 is shifted to the left in its casing, and valve 320 is rotated to bring grooves 452 and 457 into communication with ports 450 and 455, respectively, then the pressure fluid is supplied to the left hand end of cylinder 56 from duct 358 through duct 454, groove 452, port 450 and duct 445, while the opposite end of cylinder 56 is on exhaust through ducts 465, 460 and 461, the last-named leading directly to the sump 350.

There is a valve 490 (Figs. 2, 38, and 41) mounted to be reciprocal in a block 491. This block is secured in any suitable manner to trunnion 106 to swing with cylinder 98. The valve 490 is normally pressed to the position shown in Figs. 2 and 41 by a coil-spring 492. In the position shown, the valve permits the connection of line 482, that leads to one side of piston 121, with line 470 that communicates with port 455 (Fig. 28) of valve casing 321. The connection is through the ducts 494 and 495. The cylinder 98 is connected at the opposite side of piston 121 by a duct 480 with the casing of valve 467.

In the positions of valves 490, 467 and 320 shown in Figs. 28 and 41, the pressure fluid is supplied to one side of piston 121 from longitudinal pressure line 358 (Fig. 28) through duct 458, groove 456, port 455, and ducts 470 (Fig. 41), 495, 494 and 482; while the opposite side of the piston 121 is on exhaust through ducts 480 and 461. When the line 470 is on supply, the pressure fluid also forces open a check valve 485 against the resistance of spring 483. Thereby the pressure fluid also flows from duct 487 to duct 482 through duct 486.

Mounted to reciprocate within the valve casing 491 is a plunger 510 (Figs. 2, 19, 38, and 41). This plunger has a collar or shoulder 505 formed on it which is adapted to engage the front face of valve 490 to move that valve rearwardly against the resistance of spring 492 when the plunger is moved rearwardly. The front end of the plunger is adapted to ride on the tip surfaces of two spaced cam blocks 511 and 513. Cam block 511 is pivotally mounted by means of a pin 512 (Fig. 19) on a sleeve 523 (Fig. 2). Cam block 513 is rigid with an arcuate plate 514. The plate is adjustably secured by means of a bolt 515 to the sleeve 523. Sleeve 523 is keyed to arm 91; and trunnion 106 is journaled in this sleeve. The bolt 515 passes through an arcuate slot 516 in the plate 514 and threads into the sleeve.

A coil spring 517, which surrounds pin 512, serves constantly to urge the cam block 511 counter-clockwise about its pivot pin 512, as viewed in Fig. 19, thus tending to hold the cam block against lug 518 formed on sleeve 523. As swing cylinder 98 causes carrier 95 to move counter-clockwise, then, the plunger 510 first rides on the tip surface of cam block 511 to force valve 490 inwardly in valve casing 491. Then spring 492 returns the valve to its forward position. Then the plunger 510 engages and rides on cam block 513 and the valve is forced inwardly again. Then the swing cylinder 98 is reversed as will be described hereinafter; and spring 492 forces the valve forward again. Then the valve engages cam block 511, but spring 517 allows cam block 511 to rock out of the way and the plunger 510 rides idly over the cam.

The distance which carrier 95 swings is adjustable, but for any given gear job is constant. Hence cam 513 can be fixed to sleeve 523 after adjustment. Plunger 510 does not have to ride beyond cam 513 in the swing of carrier 95. Slot 516 permits of adjustment of ring 514 to adjust the distance between the points of trip of valve 490.

The plunger 510 is adapted not only to move valve 490 but also to trip a limit switch 536, the purpose of which will appear hereinafter. The limit switch is mounted on block 491 (Fig. 2). There is a bell-crank lever 525 pivotally mounted at 526 on a block 527 which is secured to block 491 by screws 527'. This lever contacts at one end with a pin 506 which is mounted within valve 490. At its opposite end the lever has a pin 528 adjustably threaded into it which operatively engages the limit switch 536. A coil spring 529, which is housed in a recess in block 527, serves to hold the lever in engagement with pin 506. Pin 506 extends forwardly in valve 490, and is adapted to be engaged by plunger 510 and pushed rearwardly by that plunger after a predetermined amount of rearward movement of the plunger.

The rearward movement of plunger 510 does not cause valve 490 to be fully shifted; it serves only to start shifting movement of valve 490. The valve is adapted to be moved on and fully shifted by hydraulic pressure supplied from duct 500 (Fig. 41) when duct 386, with which duct 500 connects, is on supply. Valve 490 is adapted to be returned again to forward position by spring 492 and by hydraulic pressure supplied from duct 385 through duct 501 when duct 385 is on pressure and duct 386 on exhaust.

As previously stated, swing cylinder 98 and reciprocable cylinder 56 (Fig. 2) are interlocked so that their movements alternate in the transfer cycle. For this purpose there are provided the two valves 472 and 520 (Figs. 2, 19 and 41).

Valve 472 is mounted to reciprocate in a bore 473 drilled in arm 91. It is normally held closed by a coil-spring 474. It is adapted to be opened by a pin 476 (Fig. 19) which is adjustably threaded into an arm 477. This arm is secured by screws 478 to trunnion 106 to swing with carrier 95. Valve 472 is connected by duct 471 (Fig. 41) with duct 469 which in turn is connected to duct 479. Valve 472 is connected by duct 475 with bore 466 (Figs. 2 and 41) which houses valve 467. When valve 472 is open, then, the pressure fluid can be supplied from duct 470 through ducts 469, 471 and 475 to move to and hold the valve 467 in the positon shown in Fig. 41, causing the right hand end of reciprocal cylinder 56 to be put on supply.

The valve 472 has a port 479 in it (Fig. 19) which is normally closed by a ball check valve 481. A duct 484 communicates with port 479 when the ball check valve is open. This duct in turn communicates with a duct 488 that extends diametrically through the valve. The last named duct communicates with duct 471.

When duct 470 is on exhaust, valve 472 will be closed by spring 474 but the left hand end of bore 466, in which valve 467 slides, may exhaust through duct 475, port 479, ducts 484, 488, 471 and 470. This will permit shift of valve 467 over to the right from the position shown in Fig. 41.

Movement of valve 467 in one direction, then, is controlled from the valve 472 which is operated in one direction by swinging carrier 95. Movement of valve 467 in the opposite direction is controlled by movement of slide 55. There is a valve 520 (Figs. 2 and 41) mounted to be reciprocal in the slide 55. This valve is normally held closed by a coil spring 521. It has a long stem portion 541 projecting rearwardly from it and passing through a hole in bridge member 63. There is a collar 542 near the rear end of this stem. On forward movement of slide 55, this collar engages bridge member 63; and the valve is opened against the resistance of spring 521.

The chamber 543, in which the valve 520 is reciprocable, is connected to the right hand end of the cylinder 466, which houses valve 467, by a duct 522. This duct communicates with chamber 543 at one side of valve 520. A duct 524, which communicates with chamber 543 at the other side of valve 520, connects this chamber with duct 468 that, in turn, communicates with duct 445. The capacity of the right hand end of valve chamber 543 is sufficient to contain any fluid exhausting from the right hand end of valve chamber 466 in the movement of valve 467 to its shown right hand position.

The extent of the swinging movement of carrier 95 is controlled by two stop blocks 518 and 518' (Fig. 19) which are adapted to be secured adjustably to trunnion member 106 by T-bolts 507 whose heads engage in a circular T-slot 508 (Fig. 2) formed on the trunnion member. Stop 518 carries a pin 519' which is adapted to engage a stop 509 (Fig. 2) on one side of arm 91. Stop 518' is adapted to engage a corresponding stop which is on the opposite side of the arm or bracket 91.

The rotary control valve 320 (Fig. 25) is adapted to be driven by motor 340 in time with the other operations of the machine on which the loading mechanism is used. In the machine illustrated, the main drive motor 531 (Fig. 42) drives rotary cutter C, causes the slide 44, which carries the rotating cutter, to be reciprocated to move the cutter back and forth across the face of the work, and, on each revolution of the cutter, actuates the index mechanism, when the gap in the cutter is abreast of the work, to index the work. After all of the tooth spaces of the work have been cut, the automatic stop mechanism of the machine is tripped to stop the main drive motor 531 and start the motor 340 to actuate the loading mechanism to effect transfer of the completed work piece to the finished-parts magazine and transfer of a new work piece from the supply magazine to the work spindle and chucking of this new work piece.

One way in which the machine may be wired electrically to perform its functions is illustrated diagrammatically in Fig. 42. The motor, which drives fluid-pressure pump 351 (Fig. 41), is not shown in Fig. 42. It is on a separate circuit and is intended to run all the time that the machine is in operation. It may be started and stopped by start and stop buttons of its own.

A controller 530 is provided for the main drive motor 531. In addition, there are two relays 532 and 533, and several limit switches 534, 535, 536, 537, 538, 539, 540, and 541. The controller, the relays and the limit switches, may be of standard construction. The limit switch 541 is connected with the automatic stop mechanism of the machine. This stop mechanism may be of conventional construction. The limit switch 534 is a double-pole limit switch, but the others are single-pole limit switches.

When the coil 582 is energized, switch arms 551 and 581 of the relay are closed and switch arm 583 is opened. The coil is maintained energized during cutting, that is, during operation of the main motor, by a hold-in circuit extending from main line L2 through lines 575 and 584, coil 582, line 589, arm 581, lines 591 and 623, arm 580 of automatic-stop limit switch 541, and lines 624 and 546 to main line L1.

The main motor 531 of the machine may be started by pressing in the normally-open button 545 which is located at a point on the machine convenient to the operator. This closes a circuit from the main line L1 through the line 546, the normally-closed stop button 547, the line 548, the start button 545, the line 549, the line 550, the then-closed arm 551 of relay 533, the line 552, the arm 553 of limit switch 534, the line 554, the coil 555 of controller 530, and the line 556 to the main line L2. This energizes the coil 555 and causes the arms 560, 561, and 562 of the controller to be closed, starting the main motor 531. The motor is connected with these arms by the lines 563, 564, and 565, respectively, and the arms, when closed, connect these lines with main lines L1, L2, L3. The arm 553 of double-pole switch 534 is at this time closed. It may be connected directly to piston 415, as indicated diagrammatically in Fig. 41, or it may have some other connection to the sliding base 45.

The coil 574 of relay 532 is also energized when the start button 545 is pushed in, the circuit to this coil being made from main line L2 through line 575, line 576, coil 574, line 549, start button 545, line 548, stop button 547, and line 546 to main line L1. This pulls in the switch arm 573 of relay 532. The circuit to the coil 574 is maintained, after the start button 545 opens, from main line L2 through lines 575 and 576, coil 574, line 572, arm 573, line 548, stop button 547, and line 546 to main line L1.

The circuit to the coil 555 of controller 530 is maintained during operation of the main motor 531, from the main line L2 through line 556, the line 570, the coil 555, the line 554, the switch arm 553, the line 552, the switch arm 551, the line 550, the now-closed switch arm 573 of relay 532, the line 548, the stop button 547, and the line 546 to main line L1.

During the cutting operation of the machine, the switch arm 580 of the automatic stop 541 remains closed. In fact, this switch is a normally-closed switch and, when tripped, opens only momentarily and then automatically closes again.

The machine goes through its cutting cycle with the rotating cutter being fed back and forth across the face of the gear blank and the blank being indexed each time the gap in the cutter is abreast of the blank. When all of the tooth spaces of the work have been cut, the automatic stop mechanism of the machine is tripped, opening the limit switch 580 of the stop mechanism. This breaks the hold-in circuit to the coil 582 of relay 533, causing the switch arms 551 and 581 of this relay to open and allowing the switch arm 583 of the relay to close.

Opening of the switch arm 551 breaks the circuit to the coil 555 of controller 530, stopping the main drive motor 531. Closing of the switch arm 583 starts the loading motor 340, the circuit to this motor being made from the main line L1 through the line 546, the stop button 547, the line 548, the now-closed switch arm 573 of relay 532, the line 550, the line 585, now-closed switch arm 583, line 586, line 587, now-closed limit switch 538, line 588, now-closed limit switch 539, line 590, and line 575 to main line L2. The motor 340 drives valve 320 (Fig. 24).

Fastened to valve 320 by a pin 600 (Fig. 24) is a bar 601. Secured to this bar by set-screws 602 and 603 are two cam members 604 and 605, respectively.

Cam member 605 has a protuberance 606 (see Figs. 36 and 37) on its periphery which is adapted to engage a teat on a lever 613 to close normally-open limit switch 540 for an instant as the valve 320 revolves, as will hereinafter be described. Lever 613 (Fig. 37) is pivotally mounted on pin 614 in box 609 which is secured to one end of valve casing 321. This lever is held against the cam member by spring 615. The lever serves to trip limit switch 540 through engagement with the plunger of the limit switch.

Cam member 604 has a protuberance or lobe 612 formed on its periphery (see Figs. 36 and 37). This protuberance is adapted to engage a contact teat formed on a lever 607 which is pivoted by means of pin 608 in box 609. A coil spring 610 holds the lever in engagement with the periphery of the cam member. The lever engages and actuates the plunger of normally-open limit switch 539.

Cam member 604 also has two angularly spaced protuberances 616 and 617 (Fig. 36) formed on it which are axially aligned but axially spaced from protuberances 612. These are adapted to engage a teat formed in a lever 618 that is pivotally mounted by means of pin 619 in box 609. A coil spring 625 holds the lever in contact with the periphery of the cam member. The lever engages and actuates the plunger of limit switch 538.

The valve 320 is shown in Figs. 25 to 35 inclusive in the stationary position which it occupies when the work is in cutting position. The work is chucked; and the scissors 185 are open but with the clamping jaws at either side of the work in the position shown fragmentarily in dotted lines in Fig. 1 and in full lines at I in Fig. 5. This is the position occupied by the various parts when the gear is being cut.

Immediately after the last tooth space of the work has been cut, the automatic stop mechanism of the machine is tripped. This stops the main drive motor 531 of the machine, as already described, and starts motor 340 (Fig. 24) to revolve valve 320.

As the valve starts to revolve clockwise in Figs. 25 to 35, which is equivalent to downward movement in Fig. 36, the protrusion 606 (Figs. 36 and 37) rides out from under lever 613 and limit switch 540, which is a normally-open switch, opens. At the same time, the direction of flow of the motive fluid to valve 412 (Fig. 41) is reversed. Ducks 434 and 439 (Figs. 31 and 36) are moved out of registry with ports 429 and 436, respectively, and grooves 432 and 437 are brought in registry with these ports. Thus, duct 427 (Fig. 41), which connects port 429 with the left hand end of valve 412, is put on exhaust, and duct 428, which connects port 436 with the right hand end of this valve, is put on supply. This causes the valve to be shifted to the left, putting the left hand end of cylinder 419 on supply from duct 355 through ducts 421 and 417, and putting the right hand end of cylinder 419 on exhaust through ducts 425, 418, and 423. This causes the sliding base 45 (Figs. 1 and 41) to be moved out to loading position, carrying the work spindle and loading mechanism to the position shown in full lines in Fig. 1 and denoted at II in Fig. 5. In the position II of Fig. 5, the completed gear 200 is shown dotted.

Simultaneously, duct 431 is put on supply from duct 428 and duct 430 is put on exhaust through duct 427. This causes piston 280 (Figs. 41 and 13) to effect indexing of the magazines.

As soon as the sliding base starts to move away from operative position, arm 553 of double-throw switch 534 opens and arm 621 closes, the switch being constructed to operate in this way. While the sliding base is being withdrawn, the teat of lever 607 (Fig. 37) is riding on cam lobe 612, and if the lever drops off of the cam lobe, before the sliding base reaches fully withdrawn position, the limit switch 539 opens, breaking the circuit to and stopping the loader motor 340. The withdrawal of the sliding base continues, however, because of the hydraulic pressure on piston 415 (Fig. 41). The stoppage of the loader motor permits time for the sliding base to complete its withdrawal movement.

When the sliding base reaches its out or loading position, it closes normally-open limit switch 537. This switch may be positioned to be actuated by the sliding base or by piston 415 or it may be tripped by valve 420 as indicated diagrammatically in Fig. 41. The closing of switch 537 causes loader motor 340 to be started again, the circuit now being made from line 588 through line 595, now-closed limit switch 537, and line 596 to line 590.

As the valve 320 rotates on further, groove 394 (Fig. 34) is moved away from port 383 and ducts 401 and 408 are moved away from ports 395 and 402, respectively (Figs. 34, 33 and 37), while grooves 384, 396 and 403 are moved into registry with these several ports. When groove 384 registers with port 383, duct 366 (Fig. 41) is put on supply from duct 358. This causes piston 380 to be moved to the left against the resistance of spring 382 moving draw-bar 381 (Fig. 5) forward to release collet 371.

When grooves 396 and 403 are moved into registry with ports 395 and 402, respectively, the direction of flow of the motive fluid to ducts 385 and 386 (Fig. 41) is reversed, duct 385 being put on supply and duct 386 on exhaust. This causes piston 171 (Figs. 2, 3 and 42) to be moved rearwardly in cylinder 170 to close scissors 185 and cause the clamping jaws 190 to clamp the completed work piece. Simultaneously duct 501 (Fig. 41) is put on supply and duct 500 on exhaust, causing valve 490 to be moved forward in casing 491 by action of spring 492 and fluid-pressure.

When the valve 320 has rotated on still further, the grooves 451 and 456 (Figs. 29, 28 and 36) are moved out of registry with ports 450 and 455, respectively, and grooves 452 and 457, respectively, are brought into registry with these ports. When this occurs, the direction of flow of the motive fluid to ducts 445 and 470 is reversed. Duct 445 is put on supply from duct 358 (Fig. 29) and duct 470 is put on exhaust through duct 368 (Fig. 28). This causes cylinder 56 and slide 55 to be moved forwardly with reference to the work spindle, the pressure fluid being supplied to the left hand end of piston 60 (Figs. 2 and 41) from duct 445 and being exhausted from the right hand end of this piston through duct 465, valve 467, duct 469 and duct 470. This causes the now-closed scissors 185 to be moved forwardly to strip and move the completed gear clear of the work spindle from position II to position III (Fig. 5).

In stripping the work piece from collet 371 and pulling it clear of the work spindle, adjustable trip member 635, which is carried by block 491, moves away from the plunger 636 of normally-open limit switch 535 (Fig. 42), allowing that switch to open.

At this time both sides of piston 121 (Fig. 41) are on exhaust, the lower side being on exhaust through ducts 482, 494, 495 and 470, and the upper side being on exhaust through duct 480, valve 467 and duct 461.

Near the end of its forward movement, the bridge 63 carried by slide 55 engages the head 542 of valve stem 541 (Figs. 2 and 41) and pulls valve 520 open against the resistance of spring 521. The pressure fluid from line 445 now flows through duct 468, duct 524, open valve 520, and duct 522 to the right hand end of valve 467; and this valve is moved to the left, the left hand end of the valve casing exhausting through duct 475.

The shift of valve 467 permits the pressure fluid to flow from duct 468 into duct 480 and to the upper side of piston 121. The lower end of this piston is already on exhaust, as already described through ducts 482 and 494, valve 490, and ducts 495 and 470. The swing cylinder 98 is thus moved relative to the piston, to carry the completed work piece away from the work spindle toward the magazines.

During the first part of this movement, the flange 135 (Figs. 6 to 9) slides on flat surface 151, but when the gear teeth 141 engage the teeth of pinion 146, swivel member 148 (Figs. 2 and 8) is rotated through 90° to swing the completed gear from vertical to horizontal position as it is swung away from the work spindle toward the finished-parts magazine.

The arm or carrier 95 swings until the gear, which is carried by the gripping jaws is in registry with that spool of the finished-parts magazine which is then in work-receiving position. When the loader arm 95 reaches this position, plunger 510 has ridden up on cam block 511 far enough to close the normally-open limit switch 536.

The teat 616 (Fig. 36) and cooperating lever 618 and limit switch 538 (Figs. 37 and 42) insure that the arm 95 will register with the desired spool before the completed work piece is dropped. The teat operates through lever 618 to open the limit switch 538. If limit switch 536 (Fig. 42) has not previously been closed, then, by movement of plunger 510 the loading motor 340 will be stopped. In other words, if the arm 95 has not completed its swing into registry with the spool of the finished-parts magazine in the time allowed, the loading motor will be stopped, but the arm 95 will continue to swing on under hydraulic power to bring the completed gear into registry with the desired spool 230'. When the arm has brought the jaws into registry with the desired spool of the finished-parts magazine, limit switch 536 will be closed by plunger 510; and the loading motor 340 will be restarted, the circuit being made through the now-closed limit switches 536 and 537 from the line 586 through the lines 598, 588, 595, 596, and 590.

In the continued rotation of the valve 320, grooves 397 and 404 (Figs. 33, 32 and 36) come into registry with ports 395 and 402. When this occurs, the direction of flow of the motive fluid in the ducts 385 and 386 is again reversed. Duct 385 is put on exhaust and duct 386 is put on supply. This causes piston 171 (Figs. 2, 3 and 41) to be moved rearwardly in cylinder 170 again, opening scissors 185, and causing the completed gear to be dropped and deposited on that spool 230' of the finished-parts magazine which is at this time in receiving position. This position is denoted at IV in Fig. 5.

As the swing cylinder rotates as described, plunger 510 (Figs. 2 and 41) rides on cam block 511 and is forced inwardly. The shoulder on the plunger therefore moves the valve 490 slightly rearwardly. This temporarily cuts off flow of the exhaust fluid from swing cylinder 98 through duct 482, holding the cylinder against swing during deposit of the completed gear on the spool of the finished-parts magazine. The pressure fluid flowing from duct 386 through duct 500, when duct 386 is put on supply, as described just above, carries the valve 490 on further to its rearmost position, thus allowing the swinging motion of the swing cylinder to be resumed.

With the restarting of the loading motor 340, if it has been stopped, lever 618 rides off the teat 616 (Figs. 36 and 37) and the limit switch 538 is reclosed.

As the swing cylinder 98 and arm 95 continue their movements after the completed gear is dropped, the arm moves on until the open scissors 185 are brought into angular registry with that spool 230 of the supply magazine which is in the position denoted at V in Fig. 5. In the first part of this movement, the plunger 510 (Figs. 2 and 41) will ride off of cam block 511 allowing switch 536 (Figs. 2 and 42) to reopen. In the further part of the movement, the plunger will ride up on the surface of cam block 513 (Fig. 19) and be pushed inwardly again against the resistance of spring 492. This will move valve 490 (Figs. 2 and 41) slightly rearwardly again to close off connection between lines 470 and 482 (Fig. 41) and stop movement of swing cylinder 98. At the same time it will again close limit switch 536 (Figs. 2 and 42).

In this movement, also, teat 617 (Figs. 36 and 37) engages lever 618 opening the limit switch 538 again. This will stop the loader motor 340 if the loading arm 95 has not completed its swing in the time allowed. If this occurs, the arm 95 will continue its swing as before under hydraulic power.

When the block 518 (Fig. 19) contacts stop 509 (Fig. 2), the clockwise swing movement of arm 95 will be stopped.

If the loader motor stops, it is restarted when limit switch 536 is reclosed by plunger 510 when the plunger 510 rides up on cam block 513 (Figs. 2 and 19), that is, when the arm 95 registers with the desired spool of the supply magazine. When the motor is restarted, lever 618 (Fig. 37) rides down off teat 617 (Fig. 36) and switch 538 recloses.

The valve 320 will now have rotated far enough for the groove 446 (Figs. 27 and 36) to have come into registry with port 443. This puts duct 435 (Fig. 41) on supply causing piston 274 (Figs. 15 and 41) to be raised to lift the stack of blanks on the described spool far enough for the uppermost blank in the stack to be brought into registry with the open gripping jaws. Accurate centering is insured by stop plate 210 (Figs. 2 and 4) which limits this upward movement by engagement with the uppermost blank on the spool.

Immediately after this, valve 320 will have rotated far enough to bring grooves 398 and 405 (Figs. 33, 32, and 36) into registry with ports 395 and 402, respectively. This again reverses the direction of flow of the motive fluid to lines 385 and 386 (Fig. 41), duct 385 being put on supply from ducts 358 and 414 (Fig. 33) and duct 386 being put on exhaust through port 402, groove 405 and duct 413. This causes piston 171 to be moved rearwardly in cylinder 170 (Figs. 2, 3 and 41) to close scissors 185 and cause the gripping jaws to clamp the new work piece which has been lifted between them. Simultaneously valve 490 (Figs. 2 and 41) is moved forwardly in its chamber 491 by pressure from line 385 through duct 501, duct 500 being on exhaust through line 386.

As valve 320 continues to rotate, groove 444 (Figs. 27 and 36) is brought back into communication with port 443. Duct 435 (Fig. 41) is thus put on exhaust through duct 367 (Fig. 27) and piston 270 (Figs. 15 and 41) drops by gravity in cylinder 271 moving fork 266 back to normal inoperative position.

In the further rotation of valve 320, grooves 451 and 456 (Figs. 29, 28, and 36) are brought back into communication with ports 450 and 455. This puts duct 445 on exhaust and duct 470 on supply. The valve 467 is still in its leftward position, however. Both sides of piston 60 (Figs. 2 and 41) are, therefore, now on exhaust, the left hand side being on exhaust through duct 445 and the right hand side being on exhaust through ducts 465, 460 and 461. The slide 55 accordingly remains stationary.

The valve 472 is at this time held closed by action of spring 474. Hence, communication between lines 471 and 475 is closed off, so that valve 467 remains over to the left. The pressure fluid flowing from duct 470 through duct 495, valve 490, and duct 494 into duct 482, and from duct 470 through duct 487, now-open check valve 485 and duct 486 into duct 482 enters the cylinder 98 at the underside of piston 121. The upper side of this piston is on exhaust through ducts 480, 468 and 445. Hence, swing cylinder 98 is rotated to swing arm 95 back toward the work spindle.

In this return swing, the arm is not stopped because plunger 510 (Figs. 2, 38, and 41) passes idly over cam block 511 (Figs. 2 and 19), the cam block swinging out of the way. In this return movement, the swivel member 150 (Figs. 2, 9 and 10) is rotated back through 90° when the arm 95 has swung far enough for gear teeth 141 to rotate pinion 145 to move the blank from vertical to horizontal position. Thus, the new gear blank is swung into the correct plane to go onto the work spindle.

The return movement of the swing cylinder is stopped when the new blank, which is carried by the gripping jaws, is aligned axially with the work spindle. This occurs when the block 518' (Fig. 19) strikes stop 509'. In this movement, arm 95 will have swung from position V, Fig. 5, through position IV to position III.

At this point, pin 476 (Fig. 19) will engage valve 472 and open this valve against the resistance of spring 474. The pressure fluid can now flow from duct 470 (Fig. 41) through lines 469, 471 and 475 to the left hand side of valve 467. The right hand side is already on exhaust as already explained. The valve 467 will therefore be shifted back to the position shown in Fig. 41. This will put the right hand end of piston 60 (Figs. 2 and 41) on supply from duct 469 through duct 465. The left hand end of this cylinder is already on exhaust, as above explained, through duct 445. The slide 55 will therefore be moved rearwardly to cause the gripping jaws to carry the hub of the new gear blank into the open collet 471, that is, the blank will be moved from position III to position II (Fig. 5). If the blank goes on the work spindle properly the limit switch 535 is reclosed by engagement of stop 635 (Figs. 5 and 19), which threads into one side of block 491, with the plunger 636 of switch 535. Then the blank is chucked hydraulically. If the work piece does not go onto the work spindle correctly, however, then limit switch 535 does not close and the loader motor is not stopped, but makes another revolution. When this occurs, the transfer mechanism makes another cycle to unload the defective blank and install a new blank. This is an important feature of the present invention. In previous types of loading mechanisms, if the blank did not go on the work spindle the machine stopped; the operator had then to take off the defective blank and restart the machine. With the present mechanism, if a blank cannot be loaded it is carried back and dropped off at the finished-parts magazine, and the loading mechanism goes on and puts a good blank on the work spindle. The operation is therefore, continuous; and the machine needs a minimum of attention. The sliding base moves in slightly but immediately moves out as the motor 340 starts a new cycle.

Now the groove 394 (Figs. 36 and 34) of valve 320 in the continued rotation of that valve arrives back at the position shown in Fig. 34. This puts line 366 (Fig. 41) on exhaust through port 383, groove 394 and duct 392 (Fig. 34). Spring 382 then operates to move draw-bar 381 rearwardly to close collet 371 (Fig. 5) on the hub of the new gear blank and chuck that blank.

As valve 320 rotates further, ducts 434 and 439 (Figs. 31, 30 and 36) come back into registry with ports 429 and 436 as shown in Figs. 31 and 30. This puts line 427 (Fig. 41) on supply and line 428 on exhaust. Thus valve 412 is shifted back to the position shown in Fig. 41. Then duct 417 goes on exhaust through ducts 422 and 423 and duct 425 goes on supply from duct 421 through duct 418, check valve 441, and ducts 440 and 425. This starts sliding base 45 (Figs. 1 and 40) back in toward operative position. As the projecting stem of valve 420 moves away from stop 426, the valve moves fully to the left to the position shown in Fig. 41 under actuation of spring 424. Then the pressure fluid from line 418 goes directly to cylinder 419 through duct 425. In its movement, the sliding base carries the work piece from position II to position I (Fig. 5).

Simultaneously with the movement of the sliding base, piston 280 is moved back to the right to the position shown in Fig. 41, line 430 being put on supply and line 431 on exhaust. This causes the index mechanisms for the finished-parts and supply magazines to be reset.

While the movement of the sliding base to operative position is taking place, the valve 320 will have rotated to a position where ducts 401 and 408 (Figs. 33, 32 and 29) will be brought back into registry with ports 395 and 402. This will put line 386 (Fig. 41) on supply and line 385 on exhaust. Piston 171 (Figs. 2, 3, and 41) will again be moved forward in its cylinder 170, and scissors 185 will again be opened. This moves the gripping jaws clear of the work piece at the point of cut so that the cutter can operate in the blank. The loading cycle is now complete.

When the valve 320 has completed a revolution and the blank has been correctly chucked, the teat 606 (Fig. 36) of cam member 605 will close limit switch 540 (Fig. 42) to energize the coil 582 of relay 533. The circuit to the coil is from line $L_2$ through line 584, coil 582, line 620, now-closed arm 621 of limit switch 534, now-closed limit switch 535, line 622, limit switch 540, line 623, automatic stop 541, which recloses immediately after it is tripped and is therefore now closed, line 624, and line 546 to main line $L_1$. This causes the arms 551 and 581 of relay 533 to be closed and the arm 583 of this relay to be opened. The opening of the arm 583 breaks the circuit to loader motor 340 and this motor stops.

When the sliding base completes its inward movement, the arm 553 of the limit switch 534 is closed and the arm 621 of this switch is opened. Coil 582, which was energized upon closing of arm 621 of switch 534, remains energized, however, through the hold-in circuit above described. Hence, on closing of arm 553 of limit switch 534, the main motor 531 is restarted and the cutter C starts to cut the new blank.

The gripping jaws 190, which are shown in Figs. 2, 3 and 4, are adapted to be used when gear blanks 200, that already have teeth roughly formed in them, are to be finish-cut on the machine. When gear blanks 200' are to be cut from the solid, gripping jaws 650 such as shown in Figs. 21, 22 and 23 are used. These jaws 650 are substituted for the jaws 190. They are like jaws 190 except that they have no stock-dividing fingers 207. In fact, the jaws 190 may be used for the purpose by removing fingers 207. The jaws 650 are shaped to have conical surfaces 654 and 655 conforming to the top and back cone angles of the work 200', thereby to grip the work securely when the scissor arms 185 to which they are secured are moved to gripping position From the preceding description it will be seen, then, that when a gear has been cut, the main motor of the machine is stopped, and the loading motor is started. Then the sliding base is withdrawn to loading position; the gear is dechucked; the scissors are closed to cause the gripping jaws to grip it; the jaws are moved forward axially of the work spindle to strip the gear from the chuck; then the jaws are swung away from the work spindle and turned to bring the gear into the correct plane; when the jaws are in registry with one spool of the finished-parts magazine, their swing is stopped and they are opened to drop the gear on the spool; then the swing of the jaws is resumed; when they are in registry with one spool of the supply magazine, the stack of blanks on that spool is raised to bring the uppermost blank on the stack between the jaws; then the jaws are closed; they are swung back and turned to bring the new blank into registry with the work spindle; then they are moved axially to push the new blank between the jaws of the chuck; then the chuck is closed to clamp the blank to the work spindle; the gripping jaws are opened to free the work so that it may be indexed during the cutting operation; the sliding base is moved back into working position; the loading motor is stopped; and the main drive motor is restarted to cause the new blank to be cut. Safety switches are provided to insure that the blank is chucked properly, and to insure that the gripping jaws are in registry with finished-parts and supply magazines, respectively, before the completed gear is dropped, or the jaws are closed in the step required to grip a new blank. The swinging motion of the jaw carrier and the opening and closing motions of the jaws are also interlocked hydraulically so that one does not occur while the other is taking place.

The finished-parts and supply magazines are indexed on the swing of the jaws between work spindle and magazines and back so that a new spool of the finished-parts magazine is in position to receive a newly completed gear at the end of each cutting cycle and a new spool of the supply magazine is in position to supply a new blank to the jaws for the next cutting cycle. When the supply of blanks in the supply magazine is exhausted, the magazine is removed from the machine and a full magazine is substituted. Likewise, when the finished-parts magazine is full, it can be taken off the machine and the completed gears removed therefrom. Changing of the magazines can be effected during cutting of a gear so that the machine can run continuously.

While the invention has been described in connection with a machine for cutting bevel gears and in connection with the loading and unloading of such gears, it will be understood that the mechanism of this invention is by no means confined to such use for it can be used in loading gears on testing, lapping or burnishing machines, and, in fact, it can be employed for loading and unloading various kinds of articles, from various types of machines, the jaws being simply shaped to suit the article which is to be handled.

While the invention has been described in connection with particular embodiments thereof and a particular use therefor, then, it will be understood that the invention is capable of further modification and use; and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a machine, a work support, a magazine adapted to hold a plurality of blanks, a second magazine adapted to hold a plurality of finished work pieces, a transfer arm, means on the transfer arm for gripping a work piece, means for moving the transfer arm from registry with the work support to registry with the second magazine and then to registry with the first magazine and then back to registry with the work support again, and means for actuating the gripping means during said movement of the transfer arm so that it grips a completed work piece when the arm is first in registry with the work support, releases that work piece when the arm is in registry with the second magazine, grips a blank when the transfer arm is in registry with the first magazine, and releases the blank when the transfer arm is again in registry with the work support.

2. In a machine, a work support, a magazine adapted to hold a plurality of blanks in stacked coaxial position thereon, a transfer arm, gripping means carried by said arm and adapted to hold a blank, means for moving the transfer arm between registry with the magazine and registry with the work support, and means for moving the stack of blanks in the magazine axially each time that the transfer arm is in registry with the magazine to move the uppermost blank in the stack into position to be gripped by the gripping means.

3. In a machine, a work support, a magazine adapted to hold a plurality of blanks in stacked coaxial position thereon, a transfer arm, gripping means carried by said arm and adapted to hold a blank, means for moving the transfer arm between registry with the magazine and registry with the work support, fluid-pressure operated means for moving the stack of the blanks in the magazine axially each time that the transfer arm is in registry with the magazine to move the uppermost blank in the stack into position to be gripped by the gripping means, and a stop carried by the transfer arm adapted to engage said uppermost blank on said movement to limit said movement.

4. In a machine, a work support, a magazine adapted to hold a plurality of blanks in stacked coaxial position thereon, a transfer arm, a pair of movable gripping jaws carried by said arm, means for moving the transfer arm between registry with the magazine and registry with the work support, fluid-pressure operated means for moving the stack of blanks in the magazine axially each time that the transfer arm is in registry with the magazine to position the uppermost blank in the stack between the gripping jaws, a stop on the transfer arm for engaging said uppermost blank to limit said axial movement, and means operative to close said gripping jaws, when the uppermost blank has been positioned therein, and to open said jaws, when the transfer arm is in registry with the work support.

5. In a machine, a work support, a magazine comprising a rotary holder having a plurality of spools equi-spaced about its axis, each of which is adapted to hold a plurality of work pieces in coaxially stacked position, means for indexing the magazine to bring said spools successively into a predetermined transfer position, a transfer arm, means for moving the transfer arm back and forth between said transfer position and registry with the work support, gripping means on said arm adapted to hold a work piece, means operative to engage the stack of work pieces, which is at the transfer position, to move them axially to bring the topmost work piece into position where it may be gripped by the gripping means when the transfer arm is in transfer position, means for actuating the gripping means when the transfer arm is in transfer position, to grip said topmost work piece, and means operable on each cycle of movement of the transfer arm to actuate the indexing means.

6. In a machine, a work support, a work spindle journaled in the work support, chucking mechanism for securing a work piece to the work spindle, means for effecting an operation on the work piece while it is chucked, a pair of gripping jaws which are open and positioned at diametrically opposite sides of the work piece during said operation, a magazine for carrying a supply of new work pieces, a magazine for holding completed work pieces, means for stopping the first-named means when an operation on a work piece has been completed, means for thereupon successively releasing the chucking mechanism, closing the gripping jaws to grip the work piece, moving the same bodily axially of the work spindle to strip the work piece from the chucking mechanism, moving the work piece into registry with the second magazine, opening the gripping jaws to discharge the work piece into the second magazine, moving the gripping jaws into registry with the first magazine, closing said gripping jaws to grip a new work piece, moving the gripping jaws back into registry with the work spindle, causing the jaws to push the new work piece into the chucking mechanism, actuating the chucking mechanism, opening the gripping jaws again, and restarting the first-named means to effect an operation on the new work piece.

7. In a machine for operating on toothed parts, a work support, a rotary magazine having a plurality of spools equi-spaced about its axis, each of which is adapted to support a plurality of work pieces, a plurality of equi-spaced rods arranged coaxially with said spools, one for each spool, each of said rods being adapted to engage in aligned tooth spaces of the work pieces that are mounted on a spool to position said work pieces correctly angularly on the spool, a transfer member for engaging the uppermost work piece on a spool to move the same from the spool to the work support, means for indexing the magazine to bring the spools successively into position so that work pieces will be taken by the transfer member successively from different spools, and means for moving the work pieces on each spool into position for engagement by the transfer member when the spool is in transfer position.

8. In a machine for operating on toothed parts, a work support, a magazine adapted to carry a plurality of work pieces, means on the magazine adapted to engage in a tooth space of each work piece to position the work piece in desired angular position, and transfer mechanism for transferring a work piece from the magazine to the work support, said transfer mechanism comprising a pair of gripping jaws adapted to be closed to grip a work piece, and means on each jaw adapted to engage in a tooth space of the work piece to center the same angularly between the gripping jaws.

9. In a machine, a work support, a base, a magazine removably mounted on the base and comprising a plurality of spools, each of which is adapted to hold a plurality of work pieces in coaxial stacked position, transfer mechanism for transferring a work piece from a spool to the work support, indexing mechanism mounted on the base, means for positioning the magazine on the base in predetermined angular relation to the indexing mechanism, and means for operatively connecting the indexing mechanism to the magazine when the magazine is mounted in the machine.

10. In a machine, a work support, a pair of removable magazines, one of which is adapted to hold completed workpieces and the other of which is adapted to hold new blanks, each of said magazines comprising a plurality of spools that are equi-spaced about a common axis, transfer mechanism for transferring a completed work piece from the work support to a spool of the magazine for completed workpieces and for transferring a new work piece from a spool of the other magazine to the work support, indexing mechanism for each magazine, means operatively connecting the magazines to the indexing mechanisms, and means operable during transfer of the work piece from the work support to the magazine for the completed workpieces to actuate said indexing mechanisms.

11. In a machine for operating on toothed parts, a work support, a magazine having a plurality of spools equi-spaced about its axis, each of which is adapted to support a plurality of workpieces, a plurality of equi-spaced rods arranged coaxial with said spools, one for each spool, each of said rods being adapted to engage in aligned tooth spaces of the workpieces that are mounted on a spool to position said workpieces correctly angularly on the spool, and a transfer member for engaging the uppermost workpiece on a spool to move the same from the spool to the work support.

12. In a machine for operating on toothed parts, a work support, a magazine adapted to carry a plurality of workpieces, and transfer mechanism for transferring a workpiece from the magazine to the work support, said transfer mechanism comprising a pair of gripping jaws which are adapted to be closed to grip a workpiece, and a spring-pressed member on each jaw adapted to engage in a tooth space of the workpiece to center the workpiece angularly between the gripping jaws.

LEONARD O. CARLSEN.
NORMAN W. FOWLER.

REFERENCES CITED

The following references are of record in the file of this patent:

UNITED STATES PATENTS

| Number | Name | Date |
|---|---|---|
| 394,170 | Graham | Dec. 11, 1888 |
| 1,052,092 | Robertson | Feb. 4, 1913 |
| 1,794,424 | Smith et al. | Mar. 3, 1931 |
| 1,876,372 | White | Sept. 6, 1932 |
| 1,936,401 | Lovely | Nov. 21, 1933 |
| 1,945,662 | Smith | Feb. 6, 1934 |
| 2,154,038 | Evrell | Apr. 11, 1939 |
| 2,322,294 | Heyman | June 22, 1943 |
| 2,343,407 | Galloway | Mar. 7, 1944 |
| 2,352,632 | Heyman | July 4, 1944 |
| 2,360,906 | Smith | Oct. 24, 1944 |
| 2,382,013 | King | Aug. 14, 1945 |
| 2,536,413 | Bauer et al. | Jan. 2, 1951 |